US012080211B2

(12) United States Patent
Nam et al.

(10) Patent No.: US 12,080,211 B2
(45) Date of Patent: Sep. 3, 2024

(54) TIMING CONTROLLER, SOURCE DRIVER CHIP, DRIVE CIRCUIT, AND DRIVE CONTROL METHOD

(71) Applicants: Beijing ESWIN Computing Technology Co., Ltd., Beijing (CN); Hefei ESWIN Computing Technology Co., Ltd., Hefei (CN)

(72) Inventors: Jangjin Nam, Beijing (CN); Dongmyung Lee, Beijing (CN); Donghoon Baek, Beijing (CN); Daejoon Lee, Beijing (CN)

(73) Assignees: Beijing ESWIN Computing Technology Co., Ltd., Beijing (CN); Hefei ESWIN Computing Technology Co., Ltd., Hefei (CN)

( * ) Notice: Subject to any disclaimer, the term of this patent is extended or adjusted under 35 U.S.C. 154(b) by 0 days.

(21) Appl. No.: 18/146,891

(22) Filed: Dec. 27, 2022

(65) Prior Publication Data

US 2023/0386380 A1 Nov. 30, 2023

(30) Foreign Application Priority Data

May 30, 2022 (CN) ......................... 202210602870.0

(51) Int. Cl.
*G09G 3/20* (2006.01)
*G09G 3/36* (2006.01)

(52) U.S. Cl.
CPC ................. *G09G 3/20* (2013.01); *G09G 3/36* (2013.01); *G09G 2310/0272* (2013.01); (Continued)

(58) Field of Classification Search
None
See application file for complete search history.

(56) References Cited

U.S. PATENT DOCUMENTS

2007/0165127 A1 7/2007 Minami
2009/0040209 A1 2/2009 Jeong
(Continued)

FOREIGN PATENT DOCUMENTS

CN 103035174 A 4/2013
CN 104537999 A 4/2015
(Continued)

OTHER PUBLICATIONS

China National Intellectual Property Administration, First Office Action in Patent Application No. CN202210602870.0 issued on Aug. 18, 2023, which is a foreign counterpart application corresponding to this U.S. Patent Application, to which this application claims priority.

(Continued)

*Primary Examiner* — Ifedayo B Iluyomade
(74) *Attorney, Agent, or Firm* — Kolitch Romano Dascenzo Gates LLC

(57) ABSTRACT

Provided is a timing controller. The timing controller includes: M signal output terminals, wherein the M signal output terminals are respectively connected to M signal input terminals corresponding to M source driver chips; the timing controller includes a controller, a timing transmission circuit, and a pull-down circuit. The controller is configured to control the timing transmission circuit and the pull-down circuit, such that the M signal output terminals are connected to ground in a first phase, the M source driver chips are in a low power consumption mode in the case that the M signal input terminals are connected to ground, and the first phase indicates a phase in which the M source driver chips are expected to enter the low power consumption mode.

20 Claims, 9 Drawing Sheets

(52) U.S. Cl.
CPC ... *G09G 2310/061* (2013.01); *G09G 2310/08* (2013.01); *G09G 2330/023* (2013.01)

(56) References Cited

U.S. PATENT DOCUMENTS

| | | | | |
|---|---|---|---|---|
| 2011/0037758 | A1 | 2/2011 | Lim et al. | |
| 2013/0082910 | A1 | 4/2013 | Lee | |
| 2013/0088531 | A1* | 4/2013 | Su | G09G 3/2092 345/691 |
| 2015/0187267 | A1 | 7/2015 | Park | |
| 2016/0063962 | A1 | 3/2016 | Park et al. | |
| 2017/0206852 | A1 | 7/2017 | Liu et al. | |
| 2019/0107883 | A1 | 4/2019 | Ma | |

FOREIGN PATENT DOCUMENTS

| | | | | |
|---|---|---|---|---|
| CN | 104538000 | A | 4/2015 | |
| CN | 104934007 | A | 9/2015 | |
| CN | 107369415 | A | 11/2017 | |
| CN | 107481695 | A | 12/2017 | |
| CN | 107369415 | * | 11/2020 | G09G 3/3677 |
| KR | 20090014793 | A | 2/2009 | |
| KR | 20150080085 | A | 7/2015 | |
| KR | 20160047664 | A | 5/2016 | |
| KR | 101786649 | B1 | 10/2017 | |

OTHER PUBLICATIONS

China National Intellectual Property Administration, Notification to grant patent right for invention of Chinese application No. 202210602870.0 issued on Oct. 18, 2023, which is foreign counterpart application of this US application.

* cited by examiner

Voltage-mode drive（RVDS）

Current-mode drive（LVDS）

TIMING CONTROLLER, SOURCE DRIVER CHIP, DRIVE CIRCUIT, AND DRIVE CONTROL METHOD

CROSS-REFERENCE TO RELATED APPLICATION

This application is based on and claims priority to Chinese Patent Application No. 202210602870.0 filed on May 30, 2022, and entitled "TIMING CONTROLLER, SOURCE DRIVER CHIP, DRIVE CIRCUIT, AND DRIVE CONTROL METHOD," and the disclosure of which is herein incorporated by reference in its entirety.

TECHNICAL FIELD

The present disclosure relates to the field of display technologies, and in particular, relates to a timing controller, a source driver chip, a drive circuit, and a drive control method.

BACKGROUND

A display device generally includes a display panel, and a drive circuit for driving the display panel. The drive circuit includes a timing controller (TCON) and a source driver (SD) chip, and data is transmitted between the timing controller and the source driver chip via a Point-to-Point (P2P) protocol.

SUMMARY

Embodiments of the present disclosure provide a timing controller, a source driver chip, a drive circuit, and a drive control method.

In one aspect, a timing controller is provided. The timing controller includes M signal output terminals, wherein the M signal output terminals are respectively connected to M signal input terminals corresponding to M source driver chips, wherein M is a positive integer; and the timing controller includes a controller, a timing transmission circuit, and a pull-down circuit, wherein a first output terminal of the controller is connected to an input terminal of the timing transmission circuit, an output terminal of the timing transmission circuit is connected to the M signal output terminals, a second output terminal of the controller is connected to a control terminal of the pull-down circuit, a first connection terminal of the pull-down circuit is connected to the M signal output terminals, and a second connection terminal of the pull-down circuit is connected to ground; wherein the controller is configured to control the timing transmission circuit and the pull-down circuit, such that the M signal output terminals are connected to ground in a first phase, wherein the M source driver chips are in a low power consumption mode in the case that the M signal input terminals are connected to ground, and the first phase indicates a phase in which the M source driver chips are expected to enter the low power consumption mode.

In some embodiments, the controller is further configured to control the pull-down circuit, such that the M signal output terminals are not connected to ground in a second phase, wherein the M source driver chips are in a low power consumption wakeup mode in the case that the M signal input terminals are not connected to ground, and the second phase indicates a phase in which the M source driver chips are expected to enter the low power consumption wakeup mode.

In some embodiments, the pull-down circuit includes a first pull-down resistor, and the controller is configured to: control the timing transmission circuit to interrupt signal output in the first phase, and reduce a resistance of the first pull-down resistor in the first phase, such that the M signal output terminals are connected to ground in the first phase.

In some embodiments, the pull-down circuit includes a pull-down switch and a second pull-down resistor that are connected in series, wherein the second pull-down resistor is a fixed-value resistor, and the controller is configured to: control the timing transmission circuit to interrupt signal output in the first phase, and close the pull-down switch in the first phase, such that the M signal output terminals are connected to ground in the first phase.

In some embodiments, the pull-down circuit includes a first pull-down resistor, and the controller is configured to increase a resistance of the first pull-down resistor in the second phase, such that the M signal output terminals are not connected to ground in the second phase.

In some embodiments, the pull-down circuit includes a pull-down switch and a second pull-down resistor that are connected in series, wherein the second pull-down resistor is a fixed-value resistor, and the controller is configured to open the pull-down switch in the second phase, such that the M signal output terminals are not connected to ground in the second phase.

In another aspect, a source driver chip is provided. The source driver chip includes a signal input terminal, wherein the signal input terminal is connected to a signal output terminal of a timing controller, and the signal output terminal is connected to ground in a first phase under control of the timing controller, wherein the first phase indicates a phase in which the source driver chip is expected to enter a low power consumption mode; wherein the source driver chip is configured to enter the low power consumption mode in response to detecting that the signal input terminal is connected to ground.

In some embodiments, the signal output terminal is not connected to ground in a second phase under the control of the timing controller, wherein the second phase indicates a phase in which the source driver chip is expected to enter a low power consumption wakeup mode; and the source driver chip is configured to enter the low power consumption wakeup mode in response to detecting that the signal input terminal is not connected to ground.

In some embodiments, the source driver chip includes a level detector connected to the signal input terminal, wherein the level detector is configured to determine whether the signal input terminal is connected to ground by detecting a level of the signal input terminal, so as to determine whether the signal input terminal is connected to ground.

In another aspect, a drive circuit is provided. The drive circuit includes the timing controller described above and the source driver chip described above. The timing controller and the source driver are configured to perform the following drive control method.

In another aspect, a drive control method is provided. The drive control method is applicable to a timing controller, and includes: controlling M signal output terminals of the timing controller to be connected to ground in a first phase, such that M source driver chips enter a low power consumption mode in the case that M source driver chips detect that signal input terminals are connected to ground, wherein the first phase indicates a phase in which the M source driver chips are expected to enter the low power consumption mode.

In some embodiments, the timing controller includes a controller, a timing transmission circuit, and a pull-down circuit including a first pull-down resistor; and controlling the M signal output terminals of the timing controller to be connected to ground in the first phase includes: by the controller, controlling the timing transmission circuit to interrupt signal output in the first phase, and reducing the resistance of the first pull-down resistor in the first phase, such that the M signal output terminals are connected to ground in the first phase.

In some embodiments, controlling the timing transmission circuit to interrupt the signal output in the first phase, and reducing the resistance of the first pull-down resistor in the first phase include: by the controller, interrupting the signal output by the timing transmission circuit by transmitting a first timing control signal to the timing transmission circuit in the first phase, and reducing the resistance of the first pull-down resistor by transmitting a first pull-down control signal to the pull-down circuit in the first phase.

In some embodiments, the timing controller includes a controller, a timing transmission circuit, and a pull-down circuit, wherein the pull-down circuit includes a pull-down switch and a second pull-down resistor that are connected in series, wherein the second pull-down resistor is a fixed-value resistor; and controlling the M signal output terminals of the timing controller to be connected to ground in the first phase includes: by the controller, controlling the timing transmission circuit to interrupt signal output in the first phase, and closing the pull-down switch in the first phase, such that the M signal output terminals are connected to ground in the first phase.

In some embodiments, controlling the timing transmission circuit to interrupt the signal output in the first phase, and closing the pull-down switch in the first phase include: by the controller, interrupting the signal output by the timing transmission circuit by transmitting a first timing control signal to the timing transmission circuit in the first phase, and closing the pull-down switch by transmitting a second pull-down control signal to the pull-down circuit in the first phase.

In some embodiments, the method further includes: controlling the M signal output terminals not to be connected to ground in a second phase, such that the M source driver chips enter a low power consumption wakeup mode in the case that the M source driver chips detect that the signal input terminals are not connected to ground, wherein the second phase indicates a phase in which the M source driver chips are expected to enter the low power consumption wakeup mode.

In some embodiments, a total duration of the first phase and the second phase is fixed, and a duration of the second phase is less than a reference duration.

In some embodiments, the first phase and the second phase are two sub-phases in a horizontal-blanking phase, and the reference duration includes 48 clock periods.

In some embodiments, the first phase and the second phase are two sub-phases in a vertical-blanking phase, and the reference duration includes 4000 clock periods.

In another aspect, a drive control method is provided. The method is applicable to a source driver chip, and includes: entering a low power consumption mode in the case that a signal input terminal of the source driver chip is connected to ground.

In some embodiments, the method further includes: entering a low power consumption wakeup mode in the case that the signal input terminal is not connected to ground.

In some embodiments, the source driver chip includes a level detector connected to the signal input terminal, and the method further includes: determining whether the signal input terminal is connected to ground by detecting, by the level detector, a level of the signal input terminal.

In another aspect, a drive device is provided. The drive device includes a processor, a communication interface, a memory, and a communication bus; wherein the processor, the communication interface, and the memory communicate with each other by the communication bus. The memory is configured to store one or more computer programs, and the processor, when loading and running the one or more computer programs stored in the memory, is caused to perform the processes in the above drive control method.

In another aspect, a non-volatile computer-readable storage medium is provided. The non-volatile computer-readable storage medium stores one or more computer programs, wherein the one or more computer programs, when loaded and run by a processor, cause the processor to perform the processes in the above drive control method.

In another aspect, a computer program product including one or more instructions is provided. The computer program product, when loaded and run on a computer, causes the computer to perform the above drive control method.

DETAILED DESCRIPTION

For clearer descriptions of the objectives, technical solutions, and advantages of the present disclosure, the embodiments of the present disclosure are further described in detail hereinafter with reference to the accompanying drawings.

Currently, the timing controller and the source driver chip consumes great power to transmit data, that is, power consumption of the drive circuit is great. Thus, how to reduce the power consumption of the drive circuit is an intensively studied issue currently.

Implementation environments to which the embodiments of the present disclosure are applicable are described prior to detailed explanation and description of the drive control method in the embodiments of the present disclosure.

A display device generally includes a display panel, and a drive circuit for driving the display panel. The display device is a liquid crystal display device, or a display device of other type. The drive control method in the embodiments of the present disclosure is mainly applicable to a drive circuit in the display device.

Figure 1:
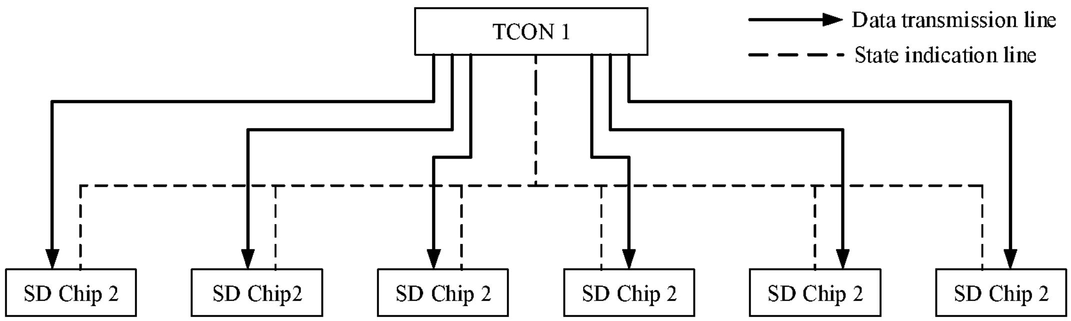
FIG. 1 is a system architecture diagram of a drive control method according to some embodiments of the present disclosure.

As illustrated in FIG. 1, the drive circuit includes a timing controller TCON 1 and a plurality of source driver chips SD chip 2. One SD chip 2 is configured to drive one display region of the display panel to display image, and a plurality of source driver chips 2 are capable of driving a whole display region of the display panel to display image. The TCON 1 is in communication connection with each of the plurality of source driver chips 2 via the P2P protocol to interact data. For example, the P2P protocol is a clock-embedded high-speed point-to-point interface (CHPI) protocol.

It should be noted that, the TCON 1 is connected to each of the plurality of SD chip 1 by a data transmission line. In addition, the TCON 1 is connected to each of the plurality of SD chip 2 by a state indication line. A signal in the data transmission line is a one-way transmission signal, and the one-way transmission signal is transmitted by the TCON 1 to the SD chip 2. A signal in the state indication line indicates whether the SD chip 2 needs clock calibration, and also indicates whether the SD chip 2 is in a loss of lock.

In some implementations, in the case that the timing controller determines, based on the state indication line, that the SD chip 2 needs clock calibration, the timing controller transmits clock calibration data to the source driver chip by the data transmission line. Upon each source driver chip completing clock calibration based on the clock calibration data from the timing controller, the timing controller sequentially sends a link stable pattern (LSP) and display data to the source driver chip. The link stable pattern instructs the source driver chip to perform phase deviation correction and scrambling reset, such that a link stable state is ensured for subsequent reception of the display data.

The timing controller enters a horizontal-blanking phase after the timing controller has transmitted one row of display data to the source driver chip. In the horizontal-blanking phase, the timing controller needs to sequentially transmit the clock calibration data and the link stable pattern to the source driver chip again. Upon completion of the horizontal-blanking phase, the timing controller transmits a next row of display data to the source driver chip. The timing controller enters a vertical-blanking phase after transmitting a frame of display data to the source driver chip. In the vertical-blanking phase, the timing controller also needs to sequentially transmit the clock calibration data and the link stable pattern to the source driver chip again. Upon completion of the vertical-blanking phase, the timing controller transmits a next frame of display data to the source driver chip.

In the solution of the present disclosure, to reduce power consumption of the drive circuit, the timing controller controls the source driver chip to enter a low power consumption mode in a first phase, and enter a low power consumption wakeup mode in a second phase. The first phase and the second phase are two sub-phases in the horizontal-blanking phase or the vertical-blanking phase. In the case that the source driver chip is in the low power consumption mode, the timing controller is in a sleep mode, and thus, data is not transmitted between the timing controller and the source driver chip. In the case that the source driver chip enters the low power consumption wakeup mode, the timing controller transmits the clock calibration data to the source driver chip to prepare for a next transmission of the display data.

On this basis, a timing controller is provided in the embodiments of the present disclosure. The timing controller is configured to control M source driver chips to enter a low power consumption mode in a first phase, and enter a low power consumption wakeup mode in a second phase. M is a positive integer. A source driver chip is further provided in the embodiments of the present disclosure. The source driver chip is configured to enter the low power consumption mode in the first phase under control of the timing controller, and enter the low power consumption wakeup mode in the second phase under control of the timing controller. In addition, a drive circuit is further provided in the embodiments of the present disclosure. The drive circuit includes a timing controller and M source driver chips, and the timing controller controls the source driver chip to enter the low power consumption mode in the first phase and to enter the low power consumption wakeup mode in the second phase. In other words, the embodiments of the present disclosure provide a solution for the source driver chip entering the low power consumption mode and being woken up from the low power consumption mode.

In conjunction with FIG. 2 to FIG. 13, structures of the drive circuit, the timing controller, and the source driver chip are described in detail, and functions of components in the drive circuit are described in detail.

Figure 2:
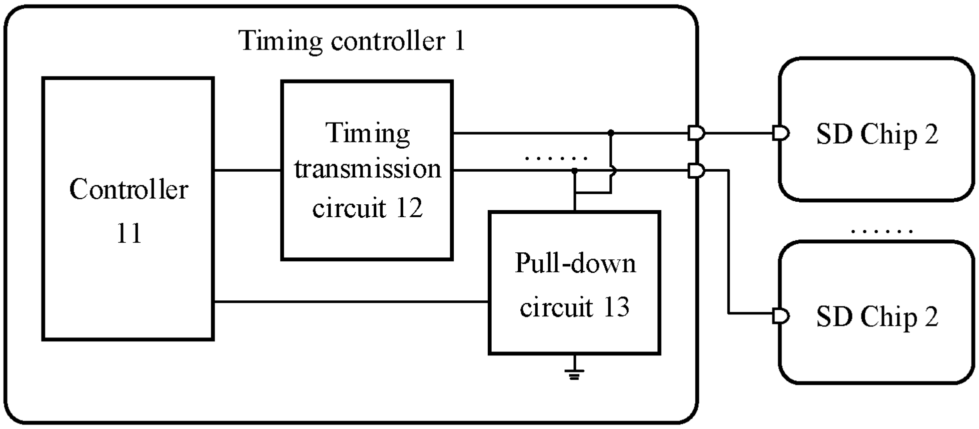
FIG. 2 is a schematic structural diagram of a drive circuit according to some embodiments of the present disclosure.

Referring to FIG. 2, the drive circuit includes a timing controller 1 (that is, TCON 1) and M source driver chips 2 (that is, SD chip 2). The timing controller 1 includes M signal output terminals, and each of the M source driver chips 2 includes one signal input terminal. The M signal output terminals are respectively connected to M signal input terminals corresponding to M source driver chips 2.

The timing controller 1 includes a controller 11, a timing transmission circuit 12, and a pull-down circuit 13. A first output terminal of the controller 11 is connected to an input terminal of the timing transmission circuit 12, an output terminal of the timing transmission circuit 12 is connected to the M signal output terminals, a second output terminal of the controller 11 is connected to a control terminal of the pull-down circuit 13, a first connection terminal of the pull-down circuit 13 is connected to the M signal output terminals, and a second connection terminal of the pull-down circuit 13 is connected to ground. It should be noted that, signals from the output terminal of the timing transmission circuit 12 and the signal output terminal of the timing controller 1 are the same, and the output terminal of the timing transmission circuit 12 is taken as the signal output terminal of the timing controller 1 in the embodiments of the present disclosure.

The controller 11 is configured to control the timing transmission circuit 12 and the pull-down circuit 13, such that the M signal output terminals are connected to ground in the first phase. The first phase indicates a phase in which the source driver chips 2 is expected to enter the low power consumption mode. The source driver chip 2 is configured to enter the low power consumption mode in response to detecting that the signal input terminal is connected to ground. That is, the M source driver chips 2 are in the low power consumption mode in the case that the M signal input terminals are connected to ground.

It should be noted that, M signal output terminals of the timing controller 1 are connected to the M signal input terminals corresponding to the M source driver chips 2 by the data transmission line (not illustrated). In the solution, the M signal output terminals are control to be grounded in the first phase, such that a level of the data transmission line is 0 in the first phase. Thus, levels of the M signal input terminals are also 0 in the first phase, that is, the M signal input terminals are connected to ground in the first phase. The data transmission line between the timing controller 1 and each source driver chip 2 includes at least one pair of differential signal lines. Each pair of differential signal lines is one data channel for transmitting a pair of differential signals. Related description is given hereinafter by taking the data transmission line including a pair of differential signal lines as an example.

Figure 3:
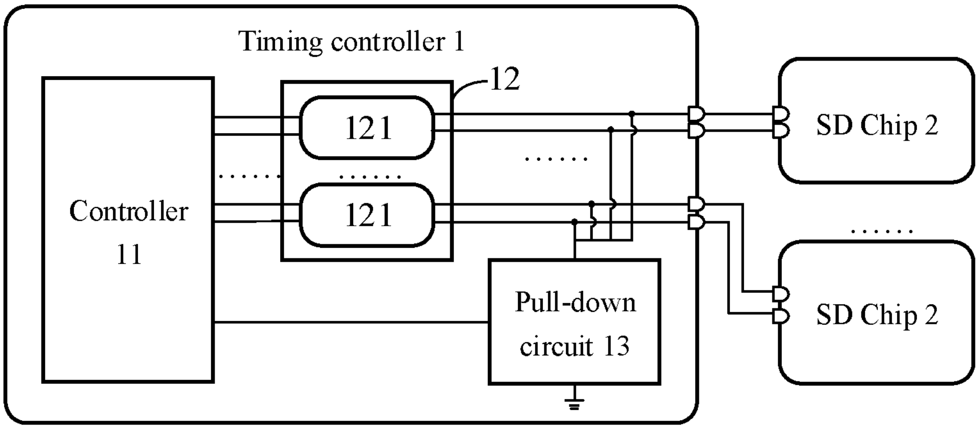
FIG. 3 is a schematic structural diagram of another drive circuit according to some embodiments of the present disclosure.

In the case that the data transmission line includes a pair of differential signal lines, referring to FIG. 3, each of the M signal output terminals includes two signal output sub-terminals, and the two signal output sub-terminals include a first signal output sub-terminal and a second signal output sub-terminal. The signal input terminal of each source driver chip 2 includes two signal input sub-terminals, and the two signal input sub-terminals include a first signal input sub-terminal and a second signal input sub-terminal. The first signal output sub-terminal of each signal output terminal is connected to the first signal input sub-terminal of corresponding source driver chip 2, and the second signal output sub-terminal of each signal output terminal is connected to the second signal input sub-terminal of corresponding source driver chip 2.

In addition, as illustrated in FIG. 3, the timing transmission circuit 12 includes M timing transmission sub-circuit 121, and each timing transmission sub-circuit 121 includes one input terminal and one output terminal. The controller 11 includes M first output terminals, each first output terminal is connected to an input terminal of one timing transmission sub-circuit 121, and an output terminal of each timing transmission sub-circuit 121 is connected to one signal output terminal. Each first output terminal of the controller 11 includes a first output sub-terminal and a second output sub-terminal, the input terminal of the timing transmission sub-circuit 121 includes a first input sub-terminal and a second input sub-terminal, and the output terminal of the timing transmission sub-circuit 121 includes a third output sub-terminal and a fourth output sub-terminal. In the embodiments of the present disclosure, the first input sub-terminal is connected to the first output sub-terminal of corresponding first output terminal, and the second input sub-terminal is connected to the second output sub-terminal of corresponding first output terminal. The third output sub-terminal is connected to the first signal output sub-terminal of corresponding signal output terminal, and the fourth output sub-terminal is connected to the second signal output sub-terminal of corresponding signal output terminal. The third output sub-terminal is taken as the first signal output sub-terminal, and the fourth output sub-terminal is taken as the second signal output sub-terminal.

Figure 5:
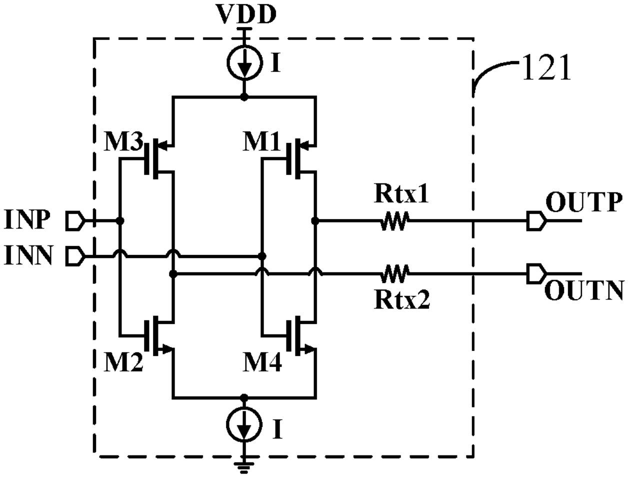
FIG. 5 is a schematic structural diagram of another timing transmission sub-circuit according to some embodiments of the present disclosure.
Figure 6:
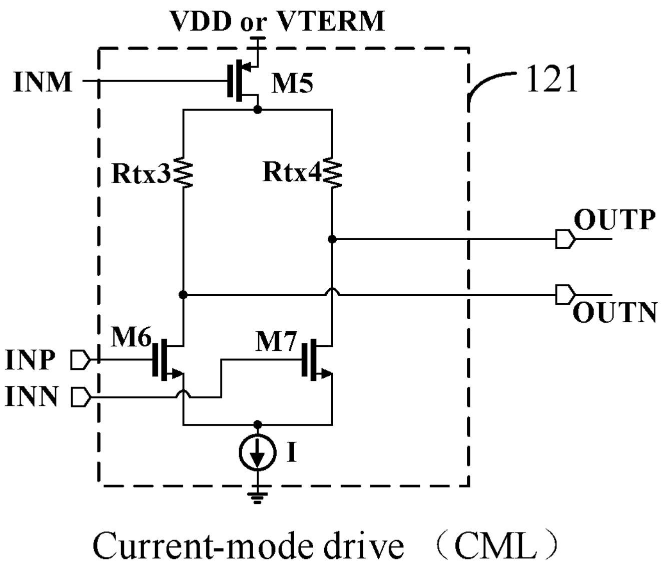
FIG. 6 is a schematic structural diagram of another timing transmission sub-circuit according to some embodiments of the present disclosure.

In the embodiments of the present disclosure, the timing transmission sub-circuit 121 may be implemented in a plurality of ways, and three implementations are described hereinafter in conjunction with FIG. 4 to FIG. 6. It should be noted that, FIG. 4 to FIG. 6 illustrate the structure of any one of timing transmission sub-circuits 121 in the timing transmission circuit 12.

In some embodiments, the timing transmission sub-circuit 121 is a voltage-mode drive circuit, for example, a reduced-voltage differential signaling (RVDS) circuit. The voltage-mode drive circuit is configured to drive corresponding circuits by a drive voltage to operate.

Figure 4:
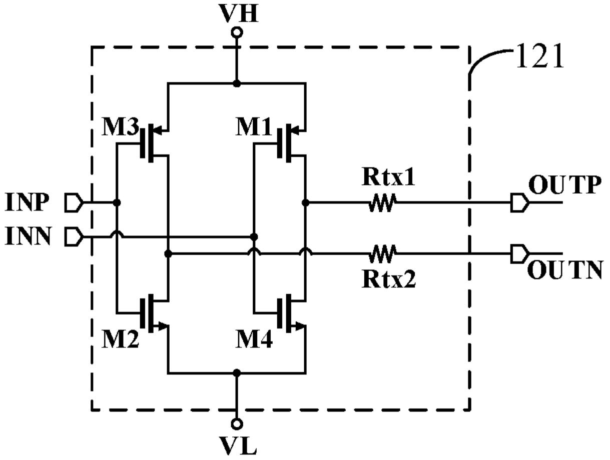
FIG. 4 is a schematic structural diagram of a timing transmission sub-circuit according to some embodiments of the present disclosure.

Taking the timing transmission sub-circuit 121 being the RVDS circuit as an example, referring to FIG. 4, the timing transmission sub-circuit 121 includes a first input sub-terminal and a second input sub-terminal. The first input sub-terminal is configured to receive a signal INP from the controller 11, and the second input sub-terminal is configured to receive a signal INN from the controller 11. The signal INP and the signal INN form a pair of differential control signals.

The timing transmission sub-circuit 121 further includes a third output sub-terminal and a fourth output sub-terminal. The third output sub-terminal is configured to output a signal OUTP, and the fourth output sub-terminal is configured to output a signal OUTN. The signal OUTP and the signal OUTN form a pair of differential timing signals, and the pair of differential timing signals include differential timing signals to be transmitted by the data transmission line. It should be noted that, the two output sub-terminals are connected to the same source drive chip by a pair of differential signal lines.

The timing transmission sub-circuit 121 further includes two drive terminals, and the two drive terminals are a first drive terminal and a second drive terminal. The first drive terminal is configured to input a first drive voltage, and the second drive terminal is configured to input a second drive voltage. The first drive voltage is greater than the second drive voltage. For example, the first drive voltage is a high level VH, and the second drive voltage is a low level VL. The timing transmission sub-circuit 121 operates under the drive of the drive voltages VH and VL.

The timing transmission sub-circuit 121 further includes four transistors and two transmitter resistors. The four transistors are transistors M1, M2, M3, and M4, and the two transmitter resistors are a first transmitter resistor Rtx1 and a second transmitter resistor Rtx2. A source of the transistor M1 is connected to the first drive terminal, a drain of the transistor M1 is connected to a source of the transistor M4 and one terminal of the first transmitter resistor Rtx1, and a gate of the transistor M1 is connected to the second input sub-terminal. A source of the transistor M2 is connected to a drain of the transistor M3 and one terminal of the second transmitter resistor Rtx2, a drain of the transistor M2 is connected to the second drive terminal, and a gate of the transistor M2 is connected to the first input sub-terminal. A source of the transistor M3 is connected to the first drive terminal, a drain of the transistor M3 is connected to the source of the transistor M2 and the one terminal of the second transmitter resistor Rtx2, and a gate of the transistor M3 is connected to the first input sub-terminal. A source of the transistor M4 is connected to the drain of the transistor M1 and the one terminal of the first transmitter resistor Rtx1, a drain of the transistor M4 is connected to the second drive terminal, and a gate of the transistor M4 is connected to the second input sub-terminal. The other terminal of the first transmitter resistor Rtx1 is connected to the third output sub-terminal, and the other terminal of the second transmitter resistor Rtx2 is connected to the fourth output sub-terminal. Each transmitter resistor is a variable resistor or a fixed-value resistor, and resistances of the two transmitter resistors are the same or different.

It can be seen from FIG. 4 that, the signal INP input by the first input sub-terminal is configured to control the transistors M3 and M2 to be turned on or turned off, and the signal INN input by the second input sub-terminal is configured to control the transistors M1 and M4 to be turned on or turned off. In the case that the transistors M1 and M2 are turned on, and the transistors M3 and M4 are turned off, the signal OUTP output by the third output sub-terminal is the high level, and the signal OUTN output by the fourth output sub-terminal is the low level. In this case, data carried in a pair of differential signals transmitted by the data transmission line is '1.' In the case that the transistors M1 and M2 are turned off, and the transistors M3 and M4 are turned on, the signal OUTP output by the third output sub-terminal is the low level, and the signal OUTN output by the fourth output sub-terminal is the high level. In this case, data carried in a pair of differential signals transmitted by the data transmission line is '0.' In the case that the four transistors are turned off, the timing transmission sub-circuit 121 does not output the signal, that is, output of the signal is interrupted. In the case that M timing transmission sub-circuits 121 do not transmit the signal, the timing transmission circuit 12 does not transmit the signal.

In the embodiments of the present disclosure, the timing transmission circuit 12 not transmitting the signal can be taken as the output terminal of the timing transmission circuit 12 being in a floating state. In the floating state, the timing transmission circuit 12 outputs random noise due to an environmental effect of static electricity and the like. In the embodiments of the present disclosure, "outputting the signal" refers to outputting the signal carrying data '1' or '0' and does not include outputting the random noise, and "not outputting the signal" refers to not outputting the signal carrying data '1' or '0.'

It should be noted that, the corresponding transistor is controlled to turned be on or turned off by controlling a level of a gate voltage input to the transistor. For example, the controller 11 controls the four transistors by controlling the levels of the signal INP and the signal INN.

It can be seen from the above description that, the controller 11 controls the four transistors to be off in the first phase by controlling the signal INP and the signal INN, such that the timing transmission sub-circuit 121 interrupts the signal output in the first phase. In the first phase, the level of the signal INP is a level capable of controlling the transistors M3 and M2 to be off, and the level of the signal INN is a level capable of controlling the transistors M1 and M4 to be off.

In some embodiments, the timing transmission sub-circuit 121 is a current-mode drive circuit, for example, a low-voltage differential signaling (LVDS) circuit. The current-mode drive circuit is configured to drive corresponding circuits by a drive current to operate.

Taking the timing transmission sub-circuit 121 being the LVDS circuit as an example, referring to FIG. 5, FIG. 5 and FIG. 4 differ in the drive node. For the timing transmission sub-circuit 121 illustrated in FIG. 5, a first drive terminal is configured to input a voltage VDD, a second drive terminal is connected to ground, a drive current I is generated under the action of the voltage VDD, and the timing transmission sub-circuit 121 operates under the action of the drive current I. It can be seen from FIG. 5 that the controller 11 controls the four transistors to be off in the first phase by the signal INP and INN, such that the timing transmission sub-circuit 121 does not transmits the signal in the first phase.

In some embodiments, the timing transmission sub-circuit 121 is also the current-mode drive circuit, for example, a current mode logic (CML) circuit.

Taking the timing transmission sub-circuit 121 being the CNL circuit as an example, referring to FIG. 6, the timing transmission sub-circuit 121 includes three input sub-terminals and two output sub-terminals. Functions and control modes of two of the three input sub-terminals for receiving the signal INP and INN are the same as those of the two input sub-terminals illustrated in FIG. 4 and FIG. 5, and functions and control modes of the two output sub-terminals are the same as those of the two output sub-terminals illustrated in FIG. 4 and FIG. 5, which are not repeated herein. Another input sub-terminal is a third input sub-terminal for receiving a control signal INM transmitted by the controller 11, such that the transistor M5 is controlled to be turned on or turned off by the control signal INM.

The timing transmission sub-circuit 121 further includes two drive terminals, and the two drive terminals are a first drive terminal and a second drive terminal. The first drive terminal is configured to input a voltage VDD or VTREM, and the second drive terminal is connected to ground. A drive current I is generated under the action of the voltage VDD or VTREM, and the timing transmission sub-circuit 121 operates under the action of the drive current I.

The timing transmission sub-circuit 121 further includes three transistors and two transmitter resistors. The three transistors are M5, M6, and M7, and the two transmitter resistors are a third transmitter resistor Rtx3 and a fourth transmitter resistor Rtx4. A source of the transistor M5 is connected to the first drive terminal, a drain of the transistor M5 is connected to one terminal of the third transmitter resistor Rtx3 and one terminal of the fourth transmitter resistor Rtx4, and a gate of the transistor M5 is connected to the controller 11. A source of the transistor M6 is connected to the other terminal of the third transmitter resistor Rtx3 and the fourth output sub-terminal, a drain of the transistor M6 is connected to the second drive terminal, and a gate of the transistor M6 is connected to the first input sub-terminal. A source of the transistor M7 is connected to the other terminal of the fourth transmitter resistor Rtx4 and the third output sub-terminal, a drain of the transistor M7 is connected to the second drive terminal, and a gate of the transistor M7 is connected to the second input sub-terminal. Each the third transmitter resistor Rtx3 and the fourth transmitter resistor Rtx4 is a variable resistor or a fixed-value resistor, and resistances of the third transmitter resistor Rtx3 and the fourth transmitter resistor Rtx4 are the same or different.

It can be seen from FIG. 6 that the signal INP input by the first input sub-terminal is configured to control the transistor M6 to be turned on or turned off, the signal INN input by the second input sub-terminal is configured to control the transistor M7 to be turned on or turned off, and the signal INM input by the third input sub-terminal is configured to control the transistor M5 to be turned on or turned off. In the case that the transistors M5 and M6 are turned on, and the transistor M7 is turned off, the signal OUTP output by the third output sub-terminal is the high level, and the signal OUTN output by the fourth output sub-terminal is the low level. In this case, data carried in a pair of differential signals transmitted by the data transmission line is '1.' In the case that the transistors M5 and M7 are turned on, and the transistor M6 is turned off, the signal OUTP output by the third output sub-terminal is the low level, and the signal OUTN output by the fourth output sub-terminal is the high level. In this case, data carried in a pair of differential signals transmitted by the data transmission line is '0'. In the case that the transistors M5, M6, and M7 are turned off, the timing transmission sub-circuit 121 does not output the signal.

On this basis, the controller 11 controls the timing transmission sub-circuit 121 not to transmit the signal in the first phase by controlling the above three transistors M5, M6, and M7 to be off in the first phase.

In the embodiments of the present disclosure, the pull-down circuit 13 may be implemented in a plurality of ways, and two implementations are described hereinafter in conjunction with FIG. 7 to FIG. 10.

Figure 7:
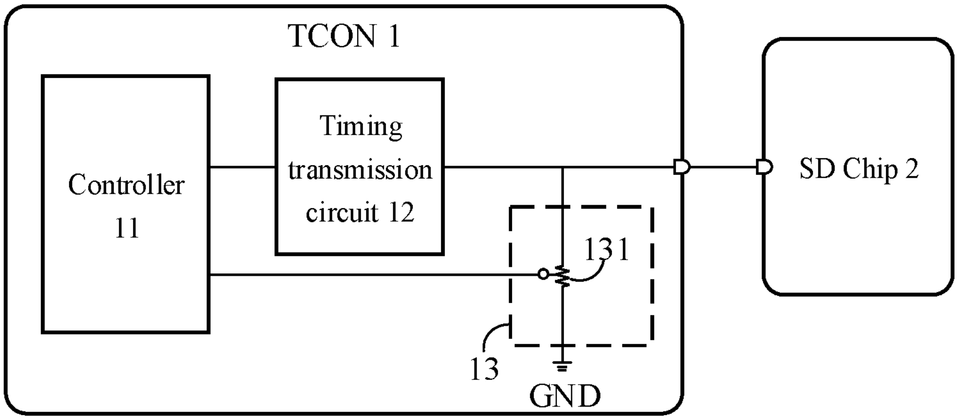
FIG. 7 is a schematic structural diagram of another drive circuit according to some embodiments of the present disclosure.

In some embodiments, referring to FIG. 7, the pull-down circuit 13 includes a first pull-down resistor 131. The controller 11 is configured to control the timing transmission circuit 12 not to transmit the signal in the first phase, and reduce a resistance of the first pull-down resistor 131 in the first phase, such that the M signal output terminals of the timing controller 1 are not connected to ground in the first phase. The first pull-down resistor 131 is a variable resistor, for example, a sliding resistor, or a variable resistor of another type. The GND in the drawings represents ground.

Illustratively, the controller 11 transmits a first pull-down control signal to the control terminal of the pull-down circuit 13 in the first phase, so as to reduce a resistance of the first pull-down resistor. That is, the pull-down circuit 13 reduces the resistance of the first pull-down resistor 131 under the action of the first pull-down control signal. In addition, the controller 11 transmits a first timing control signal to the input terminal of the timing transmission circuit 12 in the first phase, such that the timing transmission circuit 12 does not transmit the signal. That is, the output terminal of the timing transmission circuit 12 does not transmit the signal under the action of the first timing control signal. In this case, the M signal output terminals of the timing controller 1 do not transmit the signal. The first timing control signal is the pair of differential control signals formed by the signal INP and the signal INN, and the control terminal of the pull-down circuit 13 is the control terminal of the first pull-down resistor 131.

In some embodiments, in the first phase, the resistance of the first pull-down resistor 131 is less than a resistance threshold. The resistance threshold is 100 ohms or a less value. It should be noted that, in the case that the resistance of the first pull-down resistor 131 is reduced to a value less than the resistance threshold, the first pull-down resistor 131 is considered as a small resistor. A level of the first connection terminal of the pull-down circuit 13 is reduced to almost 0 under the action of the small resistor and the first connection terminal of the pull-down circuit 13 is considered as being connected to ground, and thus M signal output terminals connected to the first connection terminal are considered as ground.

Figure 8:
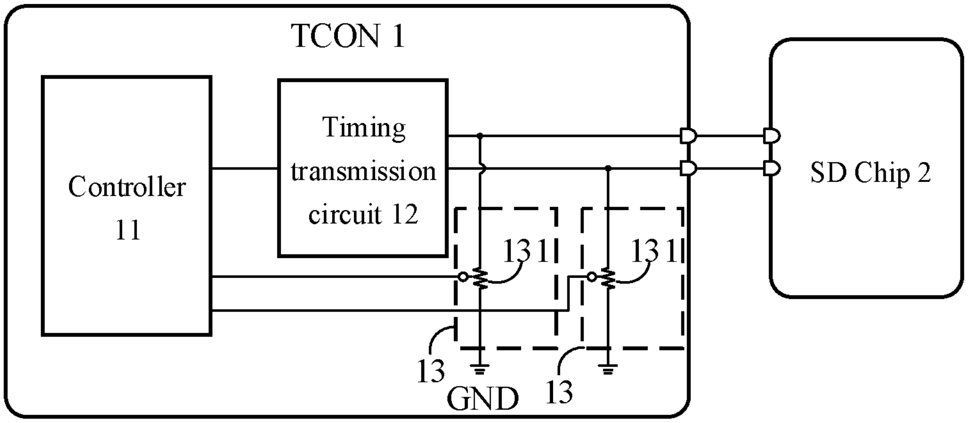
FIG. 8 is a schematic structural diagram of another drive circuit according to some embodiments of the present disclosure.

In the case that the data transmission line includes a pair of differential signal lines, referring to FIG. 8, one signal output terminal of the timing controller 1 includes two output sub-terminals, and the two output sub-terminals are configured to output a pair of differential signals and are the above first signal output sub-terminal and second signal output sub-terminal. Correspondingly, a signal reception terminal of the source driver terminal includes two reception terminals, and the two reception terminals are configured to receive a pair of differential signals and are the above first signal input sub-terminal and second signal input sub-terminal.

The timing controller 1 includes two pull-down circuits 13, and each pull-down circuit 13 includes one first pull-down resistor 131. One of the two first pull-down resistors 131 is connected to the first signal output sub-terminal, and the other of the two first pull-down resistors 131 is connected to the second signal output sub-terminal. One terminal, connected to the signal output terminal, of each of the two first pull-down resistors 131 is the first connection terminal of the pull-down circuit 13, one grounded terminal of each of the two first pull-down resistors 131 is the second connection terminal of the pull-down circuit 13. In some embodiments, resistances of the two first pull-down resistors 131 are the same or different.

The controller 11 is configured to control the output terminal of the timing transmission circuit 12 not to output the signal in the first phase, and reduce the resistance of the two first pull-down resistors 131.

Figure 10:
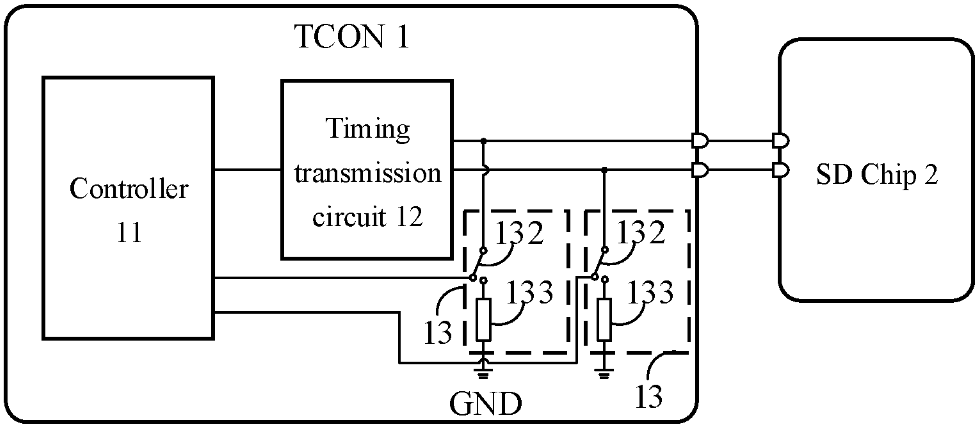
FIG. 10 is a schematic structural diagram of another drive circuit according to some embodiments of the present disclosure.

In some embodiments, as illustrated in FIG. 10, in the case that the control terminals of the two first pull-down resistors 131 are not connected, the controller 11 is configured to transmit one first pull-down control signal to the control terminal of each first pull-down resistor 131, so as to reduce the resistances of the two first pull-down resistors 131 by the two first pull-down control signals. In this case, the reduced resistances of the two first pull-down resistors 131 are the same or different. Alternatively, in the case that the control terminals of the two first pull-down resistors 131 are connected, the controller 11 is configured to transmit one first pull-down control signal to the control terminals of the two first pull-down resistors 131, so as to reduce the resistances of the two first pull-down resistors 131 by the same first pull-down control signal. In this case, the reduced resistances of the two first pull-down resistors 131 are the same.

It can be seen from the above description that the timing controller controls the source drive chip to not only enter the low power consumption mode in the first phase, but also enter the low power consumption wakeup mode in the second phase. In the embodiments of the present disclosure, the controller 11 is further configured to control the timing transmission circuit 12 and the pull-down circuit 13, such that the M signal output terminals are not connected to ground in the second phase. The source drive chip 2 is further configured to enter the low power consumption wakeup mode in response to detecting that the signal input terminal is not connected to ground. That is, in the case that the M signal output terminals are not connected to ground, the M source drive chips 2 are in the low power consumption wakeup mode.

A way of waking up the source drive chip by the timing controller is described hereinafter on the basis of the first implementation of the pull-down circuit 13.

In the embodiments of the present disclosure, the controller is further configured to increase the resistance of the first pull-down resistor 131 in the second phase, such that the M signal output terminals of the timing controller 1 are not connected to ground in the second phase. The second phase indicates a phase in which the M source driver chips 2 are expected to enter the low power consumption wakeup mode. The source driver chip 2 is further configured to enter the low power consumption wakeup mode in response to detecting that the signal input terminal is not connected to ground. For example, the controller 11 transmits a first pull-up control signal to the control terminal of the pull-down circuit 13 in the second phase, so as to increase the resistance of the first pull-down resistor 131.

In some embodiments, the controller 11 increases the resistance of the first pull-down resistor 131 to a value greater than the resistance threshold in the second phase. In other words, the resistance of the first pull-down resistor 131 is greater than the resistance threshold in the second phase. It should be noted that, in the case that the resistance of the first pull-down resistor 131 is increased to a value greater than the resistance threshold, the first pull-down resistor 131 is considered as a great resistor, the first connection terminal of the pull-down circuit 13 is not connected to ground under the action of the great resistance, and the M signal output terminals connected to the first connection terminal are not connected to ground.

It should be noted that, the timing controller 1 transmits the clock calibration data to the source driver chip 2 by the data transmission line in the second phase. In some embodiments, the controller 11 is further configured to control the timing transmission circuit 12 to output a clock calibration signal in the second phase, the clock calibration signal carries the clock calibration data. For example, the controller 11 transmits a second timing control signal to the input terminal of the timing transmission circuit 12 in the second phase, and the output terminal of the timing transmission circuit 12 outputs the clock calibration signal under the action of the second timing control signal. It should be understood that, in the second phase, the signal input terminal of the source driver chip 2 is not connected to ground, and receives the clock calibration signal. The second timing control signal is the pair of differential control signals formed by the signal INP and the signal INN.

In addition, the signal output terminal not being connected to ground refers to that the level of the signal output terminal is not equal to 0, that is, the signal is output or the signal output terminal is in the floating state. As the signal output terminal outputs the timing control signal in the second phase, the signal output terminal substantially outputs the signal in the second phase.

A second implementation of the pull-down circuit 13 is described hereinafter.

Figure 9:
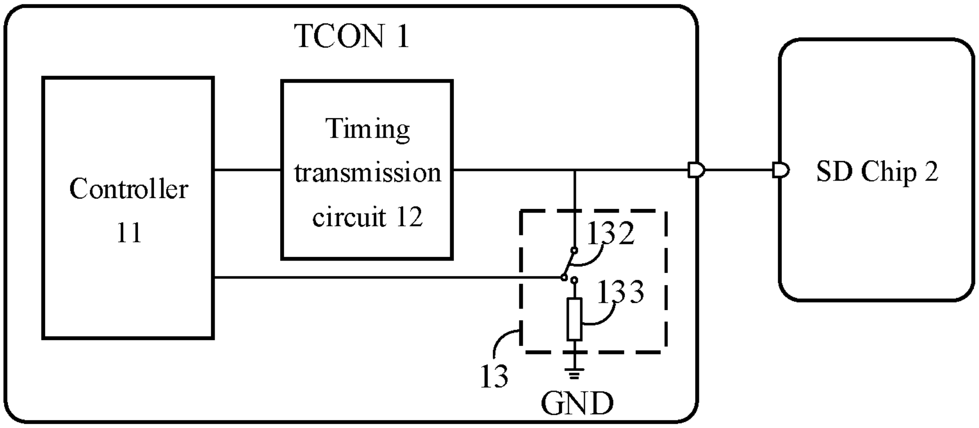
FIG. 9 is a schematic structural diagram of another drive circuit according to some embodiments of the present disclosure.

In the second implementation of the pull-down circuit 13, referring to FIG. 9, the pull-down circuit 13 includes a pull-down switch 132 and a second pull-down resistor 133 that are connected in series, and the second pull-down resistor 133 is a fixed-value resistor. A resistance of the second pull-down resistor 133 is less than the above resistance threshold, that is, the second pull-down resistor 133 is considered as a small resistor.

The controller 11 is configured to control the timing transmission circuit 12 to interrupt signal output in the first phase, and close the pull-down switch 132 in the first phase, such that at least one signal output terminal is connected to ground in the first phase. In some embodiments, closing the pull-down switch 132 is taken as turning on pull-down switch 132.

Illustratively, the controller 11 closes the pull-down switch 132 by transmitting a second pull-down control signal to the control terminal of the pull-down circuit 13 in the first phase. That is, the pull-down circuit 13 closes the pull-down switch 132 under the action of the second pull-down control signal. In addition, the controller 11 transmits the first timing control signal to the input terminal of the timing transmission circuit 12 in the first phase, and the output terminal of the timing transmission circuit 12 interrupts the signal output under the action of the first timing control signal, that is, the M signal output terminals do not output the signal.

In some embodiments, the pull-down switch 132 is a diode illustrated in FIG. 9, the transistor, or a switch of other types, which is not limited in the embodiments of the present disclosure. Taking the pull-down switch 132 being the transistor as an example, a gate of the transistor is a control terminal of the pull-down circuit 13, the gate of the transistor is connected to the controller 11, and a first electrode and a second electrode of the transistor are respectively connected to the signal output terminal and one terminal of the second pull-down resistor 133. A source of the transistor is the first electrode, and a drain of the transistor is the second electrode. Or, the source of the transistor is the second electrode, and the drain is the first electrode.

It should be noted that, in the case that the pull-down switch 132 is in a close state, as the resistance of the second pull-down resistor 133 is less, and the second pull-down resistor 133 is considered as a small resistor, a level of the first connection terminal of the pull-down circuit 13 is reduced to almost 0 under the action of the small resistor, and the first connection terminal of the pull-down circuit 13 is considered as being connected to ground, and thus M signal output terminals connected to the first connection terminal are considered as ground.

In the case that the data transmission line includes a pair of differential signal lines, referring to FIG. 10, each signal output terminal of the timing controller 1 includes two output sub-terminals, and description of the two output sub-terminals can be referred to the above related description. The timing controller 1 includes two pull-down circuits 13, and each pull-down circuit 13 includes the pull-down switch 132 and the second pull-down resistor 133 that are connected in series. The two pull-down switches 132 are of the same or different types, and the two second pull-down resistors 133 are of the same or different types.

The controller 11 is configured to control the output terminal of the timing transmission circuit 12 not to output the signal in the first phase, and close the two pull-down switches 132 in the first phase.

Figure 11:
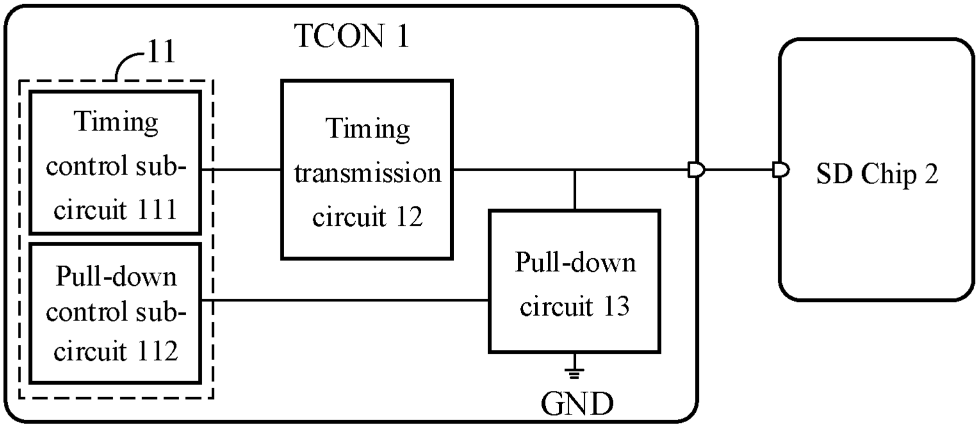
FIG. 11 is a schematic structural diagram of another drive circuit according to some embodiments of the present disclosure.

In some embodiments, as illustrated in FIG. 11, in the case that the control terminals of the two pull-down switches 132 are not connected, the controller 11 is configured to transmit one second pull-down control signal to the control terminal of each of the two pull-down switches 132, so as to close the two pull-down switches 132 by two second pull-down control signals. Alternatively, in the case that the control terminals of the two pull-down switches 132 are connected, the controller 11 is configured to transmit one second pull-down control signal to the control terminals of the two pull-down switches 132, so as to close the two pull-down switches 132 by the same second pull-down control signal.

It can be seen from the above description that, the timing controller not only controls the source drive chip to enter the low power consumption mode in the first phase, but also controls the source drive chip to enter the low power consumption wakeup mode in the second phase. A way of waking up the source drive chip by the timing controller is described hereinafter on the basis of the second implementation of the pull-down circuit 13.

In the embodiments of the present disclosure, the controller is further configured to open the pull-down switch 132 in the second phase, such that the M signal output terminals are not connected to ground in the second phase. The source driver chip 2 is configured to enter the low power consumption wakeup mode in response to detecting that the signal input terminal is not connected to ground. Illustratively, the controller 11 transmits a second pull-up control signal to the control terminal of the pull-down circuit 13 in the second phase, and the pull-down circuit 13 opens the pull-down switch 132 under the action of the second pull-up control signal.

It should be noted that, the timing controller 1 further transmits the clock calibration data to the source driver chip 2 by the data transmission line in the second phase. For details, reference may be made to related descriptions in the above embodiments, which are not described herein any further.

In the embodiments of the present disclosure, the controller may be implemented in a plurality of ways. In some embodiments, referring to FIG. 11, the controller 11 includes a timing control sub-circuit 111 and a pull-down control sub-circuit 112. An output terminal of the timing control sub-circuit 111 is the first output terminal of the controller 11, and the timing control sub-circuit 111 is configured to control the timing transmission circuit 12. An output terminal of the pull-down control sub-circuit 112 is the second output terminal of the controller 11, and the pull-down control sub-circuit 112 is configured to control the pull-down circuit 13. It should be noted that, the controller 11 is implemented by a software, a hardware, or combination thereof, which is not limited in the embodiments of the present disclosure.

In the first phase, the control signals form the controller 11 to the timing control sub-circuits are the same. For example, in the first phase, the controller 11 transmits the same first timing control signal to each timing control sub-circuit, such that the transistors in the timing control sub-circuits are all off. In a phase of transmitting the display data to M source driver chips, as the source driver chips 2 are configured to drive different display regions of the display panel to display images, the display data received by the source driver chips 2 is the pixel data matched with corresponding display region. Generally, the display data received by the source driver chips 2 is different, the M source driver chips 2 are respectively connected to M timing control sub-circuits, and the M timing control sub-circuits are configured to transmit the display data matched with corresponding display region to connected source driver chips 2. On this basis, the control signals from the controller 11 to the timing control sub-circuits are generally different, such that the timing control sub-circuits output the signals for carrying corresponding display data under the action of the corresponding control signals.

In addition, the source driver chip may be implemented in a plurality of ways. In some embodiments, the source driver chip includes a level detector 21 connected to the signal input terminal. The level detector 21 is configured to determine whether the signal input terminal is connected to ground by detecting a level of the signal input terminal.

Figure 12:
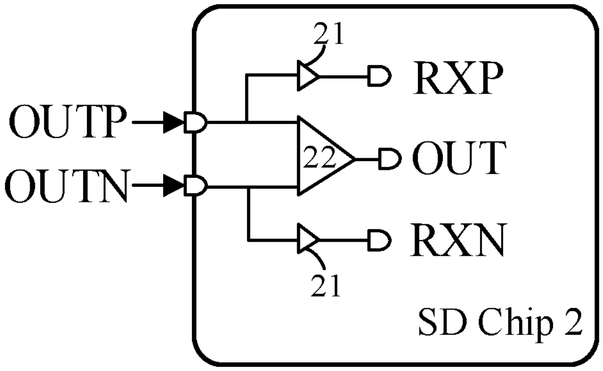
FIG. 12 is a schematic structural diagram of a source driver chip according to some embodiments of the present disclosure.

In the case that the data transmission line includes a pair of differential signal lines, referring to FIG. 12, the signal input terminal of the source driver chip includes a first signal input sub-terminal and a second signal input sub-terminal. The source driver chip includes two level detectors 21. One of the two level detectors 21 is configured to be connected to the first signal input sub-terminal, so as to detect a level RXP of the first signal input sub-terminal. The other of the two level detectors 21 is configured to be connected to the second signal input sub-terminal, so as to detect a level RXN of the second signal input sub-terminal. In the case that the two level detectors 21 detect that the levels of the first signal input sub-terminal and the second signal input sub-terminal are 0, for example, the level RXP and the level RXN are 0, the source driver chip determines that the signal input terminal is connected to ground. In the case that the two level detectors 21 detect that the levels of the first signal input sub-terminal and/or the second signal input sub-terminal are not 0, for example, the level RXP and/or the level RXN are the high level, the source driver chip determines that the signal input terminal is not connected to ground.

In addition, the source driver chip further includes a differential operational amplifier 22. The differential operational amplifier 22 includes two input terminals and one output terminal. The two input terminals are respectively connected to two signal input sub-terminals. The differential operational amplifier 22 is configured to perform differential operation on a pair of input differential signals and amplify a differential operational result, so as to acquire the output signal. Illustratively, a pair of differential signals input to the differential operational amplifier are OUTP and OUTN, and the output signal OUT of the differential operational amplifier 22 is equal to f(OUTP−OUTN). f( ) represents the amplified operation. The output signal of the differential operational amplifier 22 carries the clock calibration data, the link stable pattern, the display data, and the like.

It should be noted that, as the signal from the signal output terminal of the timing controller 1 attenuates upon being transmitted over the data transmission line, for example, the signals OUTP and OUTN change to the signals RXCP and RXCN upon being transmitted over the data transmission line, the signals received by the signal input terminal of the source driver chip are the signals RXCP and RXCN. Correspondingly, a pair of differential signals input to the differential operational amplifier are the signals RXCP and RXCN, and the output signal OUT of the differential operational amplifier 22 is equal to f(RXCP−RXCN). f( ) represents the amplification operation.

In some embodiments, the source driver chip 2 further includes a receiver resistor 23 (also referred to as a terminal resistor, denoted as Rrx). The receiver resistor 23 is a resistor matched with the transmitter resistor of the timing controller 1 and the resistance of the data transmission line.

Figure 13:
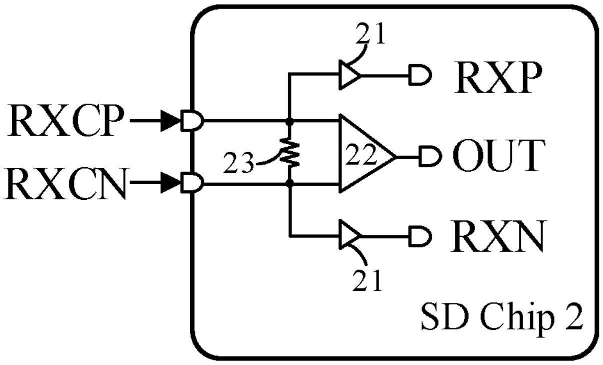
FIG. 13 is a schematic structural diagram of another source driver chip according to some embodiments of the present disclosure.

In some embodiments, in the case that the timing transmission sub-circuit 121 is the RVDS circuit illustrated in FIG. 4 or the LVDS circuit illustrated in FIG. 5, the source driver chip 2 is illustrated in FIG. 13, one terminal of the receiver resistor 23 in the source driver chip 2 is connected to the first signal input sub-terminal, and the other terminal of the receiver resistor 23 in the source driver chip 2 is connected to the second signal input sub-terminal.

Figure 14:
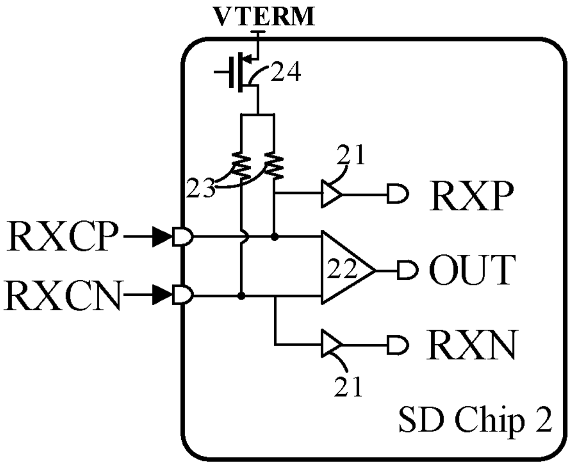
FIG. 14 is a schematic structural diagram of another source driver chip according to some embodiments of the present disclosure.

In some embodiments, in the case that the timing transmission sub-circuit 121 is the CML circuit illustrated in FIG. 6, the source driver chip 2 is illustrated in FIG. 14, and includes two receiver resistors 23 and one transistor 24 (denoted as M8). In the transistor 24, a source is connected to a voltage VTERM, a drain is connected to one terminal of each of the two receiver transistors 23, and a gate is connected to the control terminal of the source driver chip 2. The other terminal of one of the two receiver resistors 23 is connected to the first signal input sub-terminal, and the other terminal of the other of the two receiver resistors 23 is connected to the second signal input sub-terminal. The transistor 24 is turned off in the first phase, and the transistor 24 is turned on in the second phase.

It should be noted that the implementations of the controller 11, the timing transmission circuit 12, the pull-down circuit 13, and the source driver chip 2 in the above embodiments are not intended to limit the solutions. In some embodiments, the solutions can be implemented by other specific circuit structure.

It should be noted that, each circuit module includes one or more interfaces. An interface for outputting the signal is referred to an output terminal, a signal output terminal, or a signal transmission terminal, and an interface for receiving the signal is referred to an input terminal, a signal input terminal, or a signal reception terminal. For example, the output terminal of the timing controller is also referred to as a signal output terminal, or a signal transmission terminal, and the input terminal of the source driver chip is also referred to as a signal input terminal, or a signal reception terminal.

In addition, in the low power consumption mode, the timing controller does not output the signal and is in a sleep state, the source driver chip does not receive the signal, and other circuit modules is in the sleep mode except for the continuous detection of level by the level detector. In the low power consumption wakeup mode, the timing controller wakes up from the sleep state and sequentially outputs the clock calibration signal, the link stable pattern, and the like. The source driver chip wakes up from the sleep state, sequentially receives the clock calibration signal, performs the clock calibration based on the clock calibration signal, and stabilizes the link state based on the link stable pattern.

Figure 15:
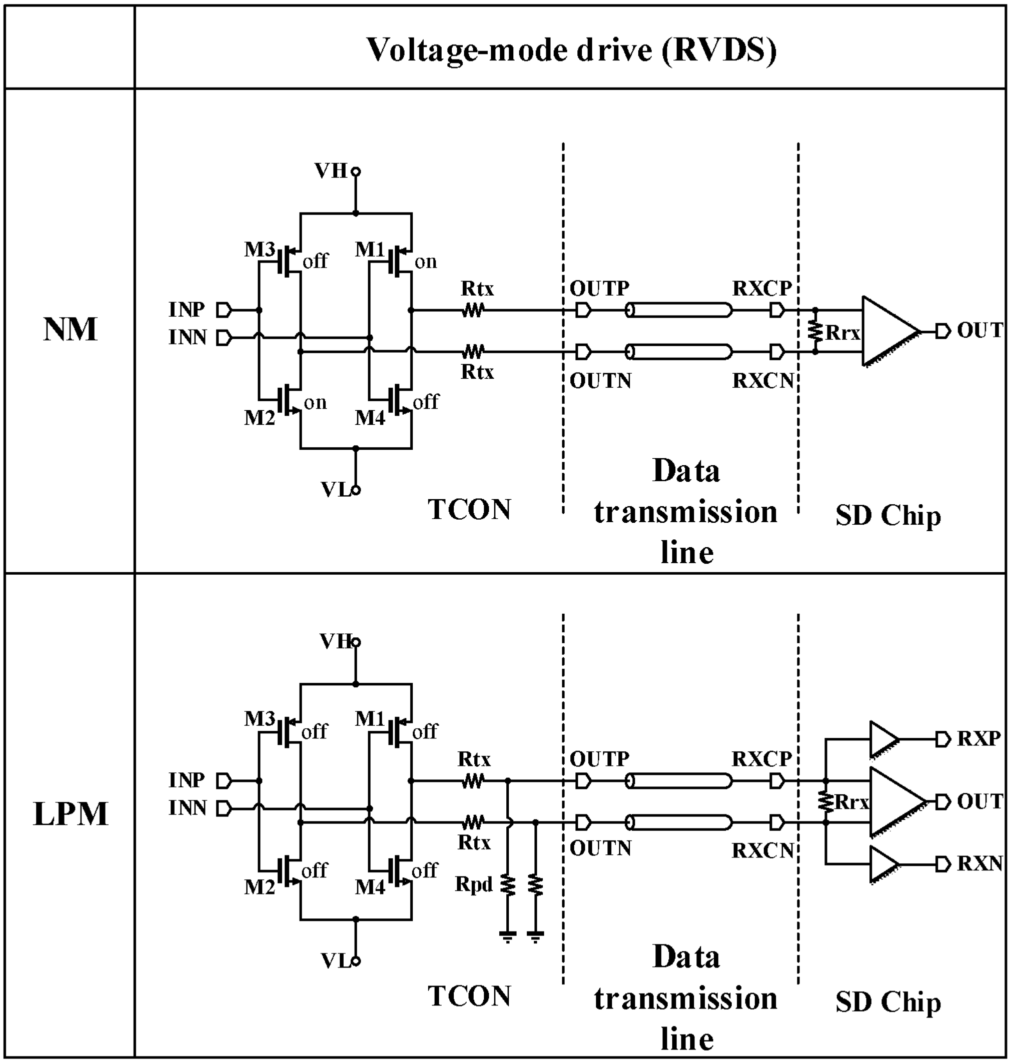
FIG. 15 is an operation schematic diagram of a drive circuit according to some embodiments of the present disclosure.
Figure 16:
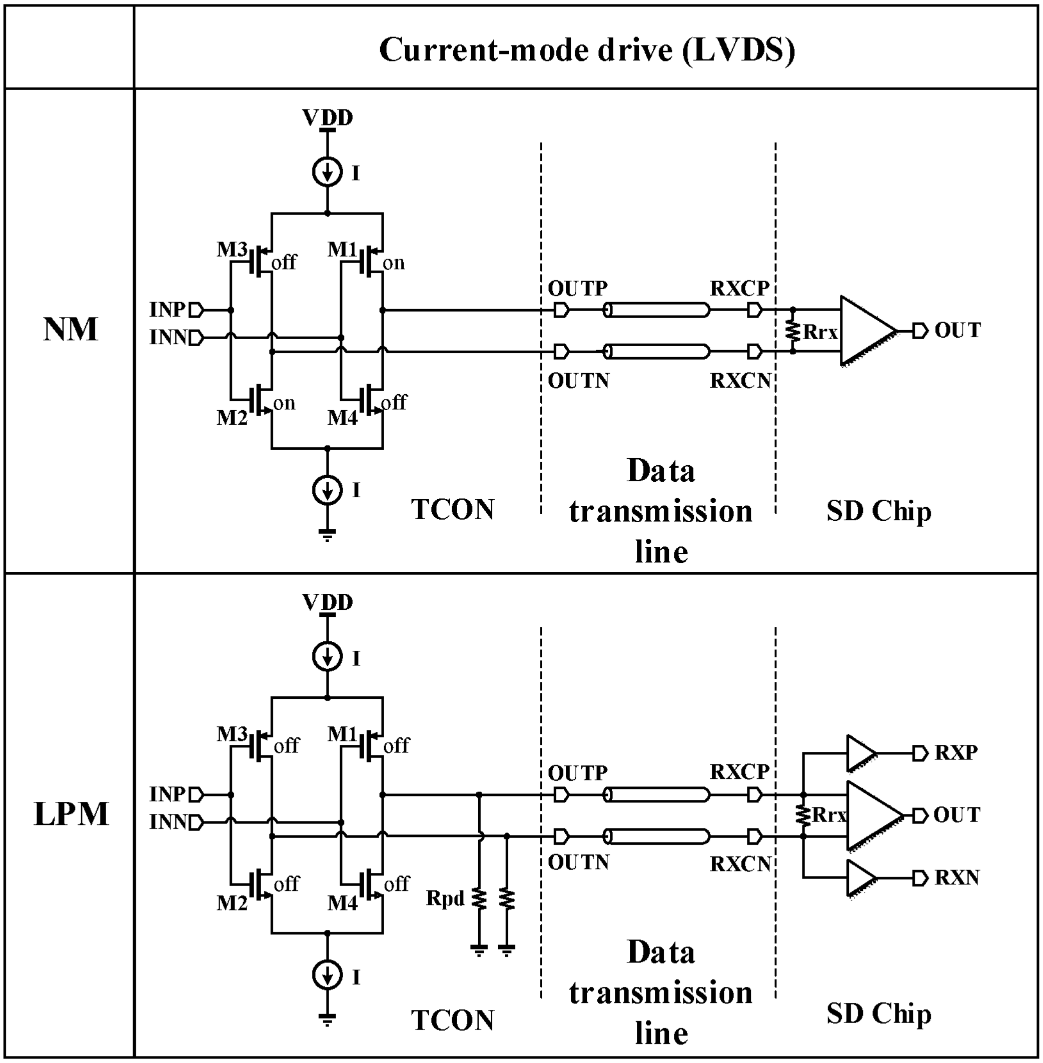
FIG. 16 is an operation schematic diagram of another drive circuit according to some embodiments of the present disclosure.
Figure 17:
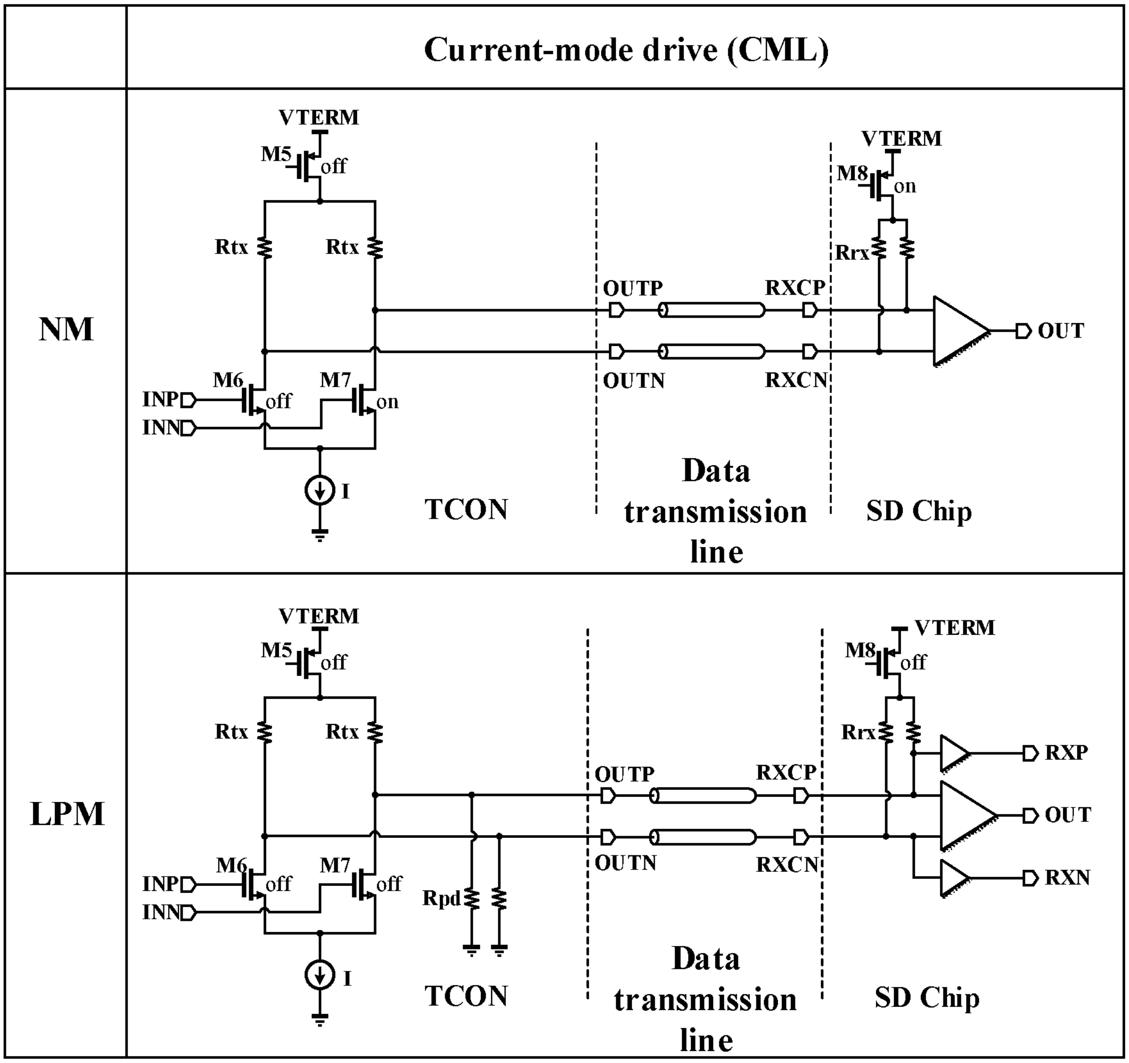
FIG. 17 is an operation schematic diagram of another drive circuit according to some embodiments of the present disclosure.

The operation schematic diagrams of the drive circuit illustrated in FIG. 15 to FIG. 17 are acquired based on the above description of parts of the drive circuit in the above embodiments. The timing transmission circuits in FIG. 15 to FIG. 17 are respectively the RVDS circuit, the LVDS circuit, and the CML circuit, the NM in FIG. 15 to FIG. 17 indicates a normal mode, including the low power consumption wakeup mode. In the normal mode, a resistance of the first pull-down resistor Rpd in the pull-down circuit is greater, and the pull-down circuit is considered as being in break, and thus the pull-down circuit is not illustrated in FIG. 15 to FIG. 17. The LPM indicates the low power consumption mode in the solution. In the low power consumption mode, the resistance of the first pull-down resistor in the pull-down circuit is less, and the first connection terminal of the pull-down circuit is considered as being connected to ground. It can be seen from FIG. 15 to FIG. 17 that, in the embodiments of the present disclosure, a low power consumption of the drive circuit is achieved by adding the pull-down circuit in the timing controller and controlling the pull-down circuit and the timing transmission circuit by the controller. It should be noted that, FIG. 15 to FIG. 17 illustrate one timing transmission sub-circuit in the timing transmission circuit and one source driver chip connected to the timing transmission sub-circuit, and do not illustrate the controller, and the pull-down circuit is the pull-down circuit in the above first implementation, that is, the pull-down circuit includes the first pull-down resistor Rpd.

It should be noted that, illustrations are given in FIG. 7 to FIG. 17 by taking one source driver chip connected to the timing controller as an example, and the connection manners of the timing controller and other source driver chips are similar.

The drive control method in the embodiments of the present disclosure is explained and described in detail hereinafter.

Figure 18:
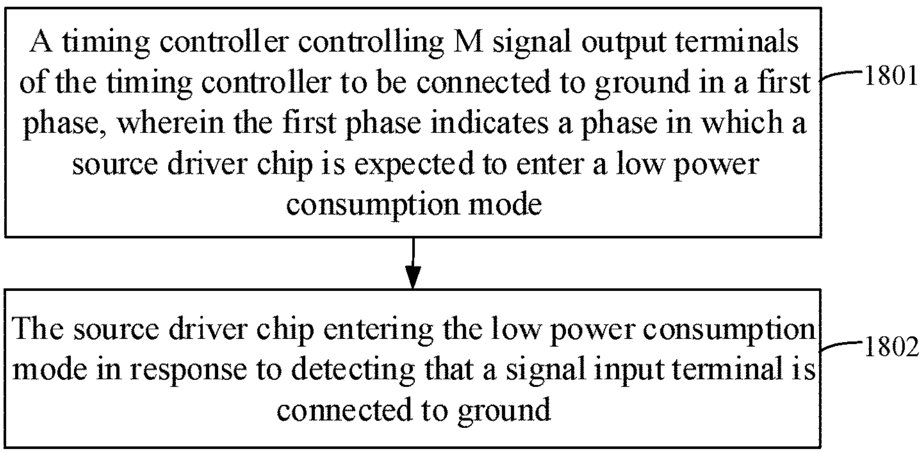
FIG. 18 is a flowchart of a drive control method according to some embodiments of the present disclosure.

FIG. 18 is a flowchart of a drive control method according to some embodiments of the present disclosure. The drive control method is applicable to any drive circuit in the above embodiments. Referring to FIG. 18, the method includes the following processes.

In S1801, a timing controller controls M signal output terminals of the timing controller to be connected to ground in a first phase, wherein the first phase indicates a phase in which a source driver chip is expected to enter a low power consumption mode.

In the embodiments of the present disclosure, the controller in the timing controller controls the timing transmission circuit and the pull-down circuit, such that the M signal output terminals are connected to ground in the first phase. M is a positive integer.

Illustratively, in the implementation of the pull-down circuit including the first pull-down resistor (a variable resistor), the controller controls the timing transmission circuit to interrupt the signal output in the first phase, and reduce a resistance of the first pull-down resistor in the first phase, such that the M signal output terminals are connected to ground in the first phase. For example, the controller transmits the first timing control signal to the timing transmission circuit in the first phase, so as to interrupt the signal output by the timing transmission circuit, and transmits the first pull-down control signal to the pull-down circuit in the first phase, so as to reduce the resistance of the first pull-down resistor. For details, reference may be made to related illustrations in FIG. 2 to FIG. 14, which are not described herein any further.

In the implementation of the pull-down circuit including the pull-down switch and a second pull-down resistor (a fixed-value resistor) that are connected in series, the controller controls the timing transmission circuit to interrupt the signal output in the first phase, and close the pull-down switch in the first phase, such that the M signal output terminals are connected to ground in the first phase. For example, the controller transmits the first timing control signal to the timing transmission circuit in the first phase, so as to interrupt the signal output by the timing transmission circuit, and transmits the second pull-down control signal to the pull-down circuit in the first phase, so as to close the pull-down switch. For details, reference may be made to related illustrations in FIG. 2 to FIG. 14, which are not described herein any further.

In S1802, the source driver chip enters the low power consumption mode in response to detecting that a signal input terminal is connected to ground.

In some embodiments, the source driver chip includes a level detector. The source driver chip detects a level of the signal input end by the level detector, and determines that the signal input terminal is connected to ground in response to detecting that the level of the signal input terminal is 0.

For details, reference may be made to related illustrations in FIG. 2 to FIG. 14, which are not described herein any further.

In addition, in the embodiments of the present disclosure, the timing controller controls the M signal output terminals not to be connected to ground in the second phase. The second phase indicates a phase in which the M source driver chips are expected to enter the low power consumption wakeup mode. The source driver chip enters the low power consumption wakeup mode in response to detecting that the signal input terminal is not connected to ground.

Illustratively, in the implementation of the pull-down circuit including the first pull-down resistor (a variable resistor), the controller increases the resistance of the first pull-down resistor in the second phase, such that the M signal output terminals are not connected to ground in the second phase. For example, the controller transmits the first pull-up control signal to the pull-down circuit in the second phase, so as to increase the resistance of the first pull-down resistor. For details, reference may be made to related illustrations in FIG. 2 to FIG. 14, which are not described herein any further.

In the implementation of the pull-down circuit including the pull-down switch and a second pull-down resistor (a fixed-value resistor) that are connected in series, the controller opens the pull-down switch in the second phase, such that the M signal output terminals are not connected to ground in the second phase. For example, the controller opens the pull-down switch by transmitting the second pull-up control signal to the pull-down circuit in the second phase. For details, reference may be made to related illustrations in FIG. 2 to FIG. 14, which are not described herein any further.

The source driver chip detects the level of the signal input terminal by the level detector, and determines that the signal input terminal is not connected to ground in response to detecting that the level of the signal input terminal is not 0, for example, the high level or the low level. For details, reference may be made to related illustrations in FIG. 2 to FIG. 14, which are not described herein any further.

In the embodiments of the present disclosure, a total duration of the first phase and the second phase is fixed. To reduce the power consumption of the drive circuit as much as possible, a duration where the source driver chip is in the low power consumption mode is greater, that is, a duration of the first phase is greater, and thus, a duration of the second phase is less. On this basis, the duration of the second phase is less than a reference duration.

In some embodiments, the first phase and the second phase are two sub-phases in a horizontal-blanking phase, and the reference duration includes 48 clock periods. That is, the duration of the second phase is less than 48 clock periods.

It should be noted that, the pixel data between the timing controller and the source driver chip is transmitted frame-by-frame, and each frame of data is transmitted on a row-wise basis. In the embodiments of the present disclosure, a row of pixel data corresponds to a row control instruction. In addition, the timing controller transmits the row control instruction followed by the row of pixel data. The row control instruction identifies a frame start polarity control signal, a deflection mode, a low power consumption mode, loading signal timing of the source driver chip, and the like. A first identification code is transmitted prior to the row control instruction being transmitted, indicating that the transmission of a row of data is started. For example, the first identification code is a K1 code. A second identification code is transmitted following the row control instruction, indicating that the transmission of a row of data is completed and the horizontal-blanking phase is started. For example, the second identification code is a K2 code. The horizontal-blanking phase is an interval between the end of transmitting of one row of pixel data and the start of transmitting of a next row of pixel data. Idle data with a fixed length is transmitted following the second identification code.

In the embodiments of the present disclosure, the row control instruction further includes first power consumption indication information, wherein the first power consumption indication information indicates whether to enter the low consumption mode in the horizontal-blanking phase.

Illustratively, in the case that the first power consumption indication information in the row control instruction is indicated by a first value, the first power consumption indication information prompts the timing controller to enter the low consumption mode in the horizontal-blanking phase. The first value is 0 or 1. Upon transmitting the idle data following the second identification code, the timing controller enters the low power consumption mode by controlling a pair of differential signal lines for transmitting the row of pixel data to be connected to the ground.

Upon receiving the row control instruction, the source driver chip acquires, based on the first power consumption indication information, the entering of the low power consumption mode in the horizontal-blanking phase. In this way, in response to detecting that the pair of differential signal lines for transmitting the row of pixel data is connected to the ground, the source driver chip also enters the low power consumption mode. In this case, data transmission over the pair of differential signal lines is stopped.

In the horizontal-blanking phase, in the case that the timing controller and the source driver chip enter the low power consumption mode, the timing controller enters the low power consumption wakeup mode from the low power consumption mode prior to transmitting the next row of pixel data. The low power consumption wakeup mode is a transmission state from the low power consumption mode to the data transmission state. In the low power consumption wakeup mode, the timing controller transmits the clock calibration data, the configuration information, and the link stable pattern to the source driver chip to wake up the source driver chip, such that the source driver chip restores to a normal operation state to transmit the next row of pixel data. The configuration information is provided for the source driver chip to configure physical layer parameters, so as to better receive the signal.

It should be noted that, a duration of the horizontal-blanking phase is fixed, it can be seen from the above description that, a sum of a duration for transmitting the idle data, a duration where the timing controller and the source driver chip are in the low power consumption mode in the horizontal-blanking phase, and a duration where the timing controller and the source driver chip are in the low power consumption wakeup mode in the horizontal-blanking phase is equal to the duration of the horizontal-blanking phase. As the duration for transmitting the idle data is fixed, in the horizontal-blanking phase, the shorter the duration where the timing controller and the source driver chip are in the low power consumption wakeup mode, the longer the duration where the timing controller and the source driver chip are in the low power consumption mode, the greater the power conservation efficiency. As the clock calibration is performed again in the low power consumption wakeup mode, the timing controller reduces the clock calibration time in the low power consumption wakeup mode by reducing an amount of transmitted clock calibration data.

Illustratively, the timing controller stores a first amount. The first amount indicates an amount of clock calibration data to be transmitted in the horizontal-blanking phase, and the first amount is acquired based on the duration of the horizontal-blanking phase. On this basis, upon entering the low power consumption mode in the horizontal-blanking phase, the timing controller determines a duration for transmitting the first amount of clock calibration data based on the duration for transmitting each clock calibration data, determines a time point of entering the low power consumption wakeup mode in the horizontal-blanking phase based on the duration, and then enters the low power consumption wakeup mode at the time point. Upon entering the low power consumption wakeup mode, the timing controller transmits the first amount of clock calibration data to the source driver chip. The first amount is less than 48, that is, the reference duration in the horizontal-blanking phase is set as 48 clock periods.

Figure 19:
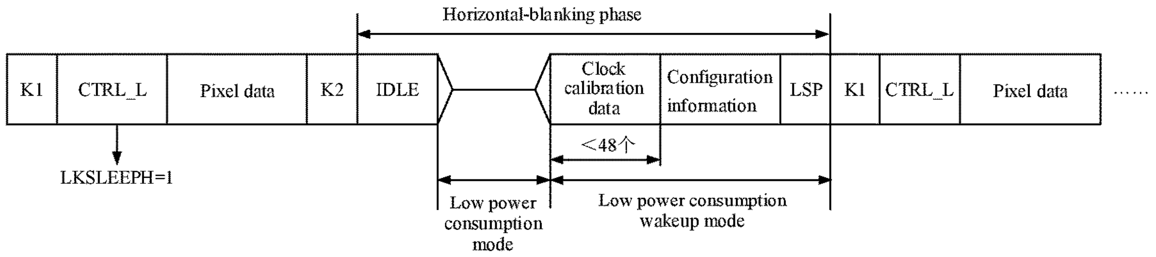
FIG. 19 is a schematic diagram of a process of transmitting one row of pixel data between a timing controller and a source driver chip according to some embodiments of the present disclosure.

FIG. 19 is a schematic diagram of a process of transmitting one row of pixel data between a timing controller and a source driver chip according to some embodiments of the present disclosure. The one row of pixel data is not a last row of pixel data in multiple rows pixel data corresponding to the source driver chip. As illustrated in FIG. 19, the K1 code is first transmitted, and the K1 code indicates that the transmission of one row of pixel data is started. The row control instruction (CTRL_L) is then transmitted following the K1 code, and the row control instruction carries the first power consumption indication information (LKSLEEPH=1). The first power consumption indication information is 1, and prompt entry into the low consumption mode in the horizontal-blanking phase. The row of pixel data is then transmitted following the row control instruction. The K2 code is then transmitted following the row of pixel data to indicate the end of the row of pixel data and the start of the horizontal-blanking phase. The idle data (IDLE) is then transmitted following the K2 code, and the timing controller and the source driver chip enter the low power consumption mode. Then, in the case that the time point of entering the low power consumption wakeup mode reaches, the timing controller transmits the clock calibration data to the source driver chip again. The amount of transmitted clock calibration data is less than 48. The source driver chip performs the clock calibration based on received clock calibration data again. Upon completion of the clock calibration by the source driver chip, the timing controller sequentially transmits the configuration information and the link stable pattern to the source driver chip, and transmits a next row of pixel data again upon transmitting the link stable pattern. The configuration information is provided to configure the physical layer parameters of the source driver chip, so as to improve the property of receiving data of the source driver chip. The configuration information is optional.

In some embodiments, the first phase and the second phase are two sub-phases in a vertical-blanking phase, and the reference duration includes 4000 clock periods. That is, the duration of the second phase is less than 4000 clock periods.

It should be noted that, for the last row of pixel data, the last row of pixel data further corresponds to one frame control instruction. The frame control instruction is transmitted following the last row of pixel data, and defines a static state or a dynamic state of the source driver chip. A third identification code is transmitted between the last row of pixel data and the frame control instruction, and indicates that the transmission of the last row of pixel data in one frame of data is completed, that is, to indicate that the transmission of one frame of data is completed. The third identification code also indicates a start of the vertical-blanking phase. For example, the third identification code is a K4 code. The vertical-blanking phase is an interval between the end of transmission of one frame of data and the start of transmission of a next frame of data. Idle data with a fixed length is transmitted following the frame control instruction.

In the embodiments of the present disclosure, the frame control instruction further includes a second power consumption indication information, and the second power consumption indication information indicates whether to enter the low consumption mode in the vertical-blanking phase.

Illustratively, in the case that the second power consumption indication information in the frame control instruction indicates the first value, the second power consumption indication information prompt the timing controller to enter the low consumption mode in the vertical-blanking phase. Upon transmitting the idle data following the frame control instruction, the timing controller controls a pair of differential signal lines for transmitting the pixel data to be connected to ground, so as to enter the low power consumption mode.

Upon detecting the second power consumption indication information in the frame control instruction, the source driver chip detects whether a pair of differential signal lines for transmitting the pixel data is connected to ground. In response to detecting that the pair of differential signal lines is connected to ground, the source driver chip also enters the low power consumption mode. In this case, data is stopped being transmitted on the pair of differential signal lines.

In the vertical-blanking phase, upon the timing controller and the source driver chip entering the low power consumption mode, the timing controller also enters the low power consumption wakeup mode from the low power consumption mode prior to transmitting the next frame of data. In the low power consumption wakeup mode, the timing controller again transmits the clock calibration data and the link stable pattern to the source driver chip to wake up the source driver chip, such that the source driver chip restores to the normal operation state to transmit the next frame of data.

It should be noted that, a duration of the vertical-blanking phase is fixed, and a sum of a duration for transmitting the idle data, a duration where the timing controller and the source driver chip are in the low power consumption mode in the vertical-blanking phase, and a duration where the timing controller and the source driver chip are in the low power consumption wakeup mode in the vertical-blanking phase is equal to the duration of the vertical-blanking phase. As the duration for transmitting the idle data is fixed, in the vertical-blanking phase, the shorter the duration where the timing controller and the source driver chip are in the low power consumption wakeup mode, the longer the duration where the timing controller and the source driver chip are in the low power consumption mode, the greater the power conservation efficiency. As the clock calibration is performed again in the low power consumption wakeup mode, the timing controller reduces the clock calibration time in the low power consumption wakeup mode by reducing the amount of transmitted clock calibration data.

Illustratively, the timing controller stores a second amount. The second amount indicates an amount of clock calibration data to be transmitted in the vertical-blanking phase, and the second amount is acquired based on the duration of the vertical-blanking phase. On this basis, upon entering the low power consumption mode in the horizontal-blanking phase, the timing controller determines a duration for transmitting the second amount of clock calibration data based on the duration for transmitting each clock calibration data, determines a time point of entering the low power consumption wakeup mode in the vertical-blanking phase based on the duration, and then enters the low power consumption wakeup mode at the time point. Upon entering the low power consumption wakeup mode, the timing controller transmits the second amount of clock calibration data to the source driver chip. The second amount is less than 4000, that is, the reference duration in the vertical-blanking phase is set as 4000 clock periods.

Figure 20:
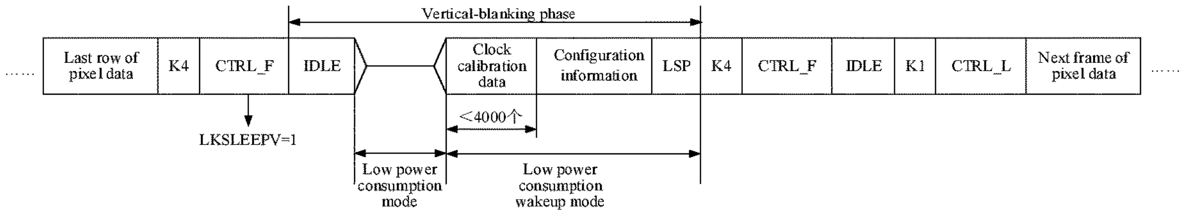
FIG. 20 is a schematic diagram of a process of transmitting a last row of pixel data between a timing controller and a source driver chip according to some embodiments of the present disclosure.

FIG. 20 is a schematic diagram of another process of transmitting one row of pixel data between a timing controller and a source driver chip according to some embodiments of the present disclosure. The one row of pixel data is the last row of pixel data in one frame of data corresponding to the source driver chip. The K1 code is first transmitted, and the K1 code indicates that the transmission of one row of data is started. The row control instruction (CTRL_L) is then transmitted following the K1 code. The row of pixel data is then transmitted following the row control instruction. As illustrated in FIG. 20, the K4 code is transmitted following the row of pixel data, and indicates that the transmission of the last row of pixel data corresponding to the source driver chip is completed. The frame control instruction (CTRL_F) is then transmitted following the K4 code, and indicates the start of the vertical-blanking phase. The idle data is transmitted following the frame control instruction, and then the timing controller and the source driver chip enter the low power consumption mode. Then, in the case that the time point of entering the low power consumption wakeup mode reaches, the timing controller transmits the clock calibration data to the source driver chip again. The amount of transmitted clock calibration data is less than 4000. The source driver chip performs the clock calibration based on received clock calibration data again. Upon completion of the clock calibration by the source driver chip, the timing controller sequentially transmits the configuration information (optionally) and the link stable pattern to the source driver chip, and transmits a next frame of pixel data again upon transmitting the link stable pattern.

It should be noted that, in the solution, the clock calibration is performed within 48 clock periods and the property of clock calibration is ensured by configuring the physical layer parameters of the source driver chip and/or optimizing a structure of a clock data recovery (CDR) circuit. The physical layer parameters of the source driver chip include CDR loop bandwidth and the like. The CDR loop bandwidth refers to a loop bandwidth of the CDR circuit in the source driver chip. The CDR circuit includes a phase locking loop (PLL), and the PLL is configured to lock a frequency and phase of the clock signal. In this case, the CDR loop bandwidth is a loop bandwidth of the PLL. The loop bandwidth of the PLL refers to a noise bandwidth of a narrow band tracking filter equivalent to a PLL loop, and characterizes a suppression effect of the PLL loop on the noise. A suppression property of the PLL loop on the noise affects locking of the PLL, that is, affects the clock calibration of the source driver chip.

In summary, in the embodiments of the present disclosure, in the phase in which the source driver chip is expected to enter the low power consumption mode, the timing controller controls the signal output terminal of the timing controller to be connected to ground. As the signal output terminal of the timing controller is connected to the signal input terminal of the source driver chip, the signal input terminal of the source driver chip is connected to ground in the case that the signal output terminal of the timing controller is connected to ground. In this way, the source driver chip enters the low power consumption mode in response to detecting that the signal input terminal is connected to ground. In the case that the source driver chip is in the low power consumption mode, the data is not transmitted between the timing controller and the source driver chip, such that the power consumption of the drive circuit is reduced.

In addition, the timing controller transmits the clock calibration data in an amount less than 48 to the source driver chip in the case that the timing controller wakes up the source driver chip in the horizontal-blanking phase, and the timing controller transmits the clock calibration data in an amount less than 4000 to the source driver chip in the case that the timing controller wakes up the source driver chip in the vertical-blanking phase, so as to shorten the duration where the timing controller and the source driver chip are in the low power consumption wakeup mode, prolong the duration where the timing controller and the source driver chip are in the low power consumption mode, and improve the power conservation efficiency.

All the above optional technical solutions can be combined causally to form the optional embodiments of the present disclosure, which are not repeated in the embodiments of the present disclosure. In addition, partial processes in the embodiments illustrated in FIG. 18 constitute the technical solution to be protected in the present disclosure. For example, S1801 independently constitutes the technical solution to be protected in the present disclosure, and S1802 also independently constitutes the technical solution to be protected in the present disclosure. That is, the present disclosure seeks protection for the drive control method applicable to the timing controller, the drive control method applicable to the source driver chip, and the drive control method applicable to the drive circuit.

In some embodiments, a computer-readable storage medium is further provided. The computer-readable storage medium stores one or more computer programs therein. The one or more computer programs, when loaded and run by a processor, cause the processor to perform the processes of the drive control method in the above embodiments. For example, the computer-readable storage medium is a read-only memory (ROM), a random-access memory (RAM), an optical disc, a magnetic tape, a floppy disk, an optical data storage device, or the like.

It should be noted that, the computer-readable storage medium in the embodiments of the present disclosure may be a non-volatile storage medium. In other word, the computer-readable storage medium in the embodiments of the present disclosure may be a non-transitory storage medium.

It should be noted that, all or some processes in the above embodiments are performed by software, a hardware, a firmware, or any combination thereof. When performed by the software, the processes are implemented in a form of a computer program product. The computer program product includes one or more computer instructions stored in the computer-readable storage medium.

That is, in some embodiments, a computer program product including one or more instructions is further provided. The one or more instructions, when loaded and executed on a computer, cause the computer to perform the processes of the above drive control method.

It should be noted that, the term "at least one" herein refers to one or more, and the term "a plurality of" refers to two or more. Unless expressly limited otherwise, the symbol "/" indicates an "or" relationship in the description of the embodiments of the present disclosure. For example, A/B indicates A or B. The term "and/or" in the context may indicate the associated relationship of the associated objects, and indicate three relationships. For example, A and/or B may indicate: A alone, A and B, and B alone. In addition, for clear description of the technical solutions of the embodiments of the present disclosure, the terms "first" and "second" are used to distinguish the same or similar objects with substantially the same functions and uses in embodiments of the present disclosure. It can be understood by those skilled in the art that the terms "first" and "second" are not intended to limit numbers and sequences, and are not necessarily different.

It should be noted that, information (including, but not limited to, user device information, user personal data, and the like), data (including, but not limited to, data for analysis, stored data, displayed data, and the like), and signal in the embodiments of the present disclosure are authorized by the user or sufficiently authorized by the parties, and collection, use, and processing of the related data should comply with corresponding legal regulation and standards of corresponding countries and regions. For example, the display data and the like in the embodiments of the present disclosure are acquired upon being sufficiently authorized.

Described above are the embodiments of the present disclosure, and are not intended to limit the present disclosure. Any modifications, equivalent replacements, improvements and the like made within the spirit and principles of the present disclosure should be included within the scope of protection of the present disclosure.

What is claimed is:

1. A timing controller, comprising:

M signal output terminals, wherein the M signal output terminals are respectively connected to M signal input terminals corresponding to M source driver chips, M being a positive integer; and a controller, a timing transmission circuit, and a pull-down circuit, wherein a first output terminal of the controller is connected to an input terminal of the timing transmission circuit, an output terminal of the timing transmission circuit is connected to the M signal output terminals, a second output terminal of the controller is connected to a control terminal of the pull-down circuit, a first connection terminal of the pull-down circuit is connected to the M signal output terminals, and a second connection terminal of the pull-down circuit is connected to ground;

wherein the controller is configured to control the timing transmission circuit and the pull-down circuit, such that the M signal output terminals are connected to ground in a first phase, wherein the M source driver chips are in a low power consumption mode in the case that the M signal input terminals are connected to ground, and the first phase indicates a phase in which the M source driver chips are expected to enter the low power consumption mode.

2. The timing controller according to claim 1, wherein the controller is further configured to control the pull-down circuit, such that the M signal output terminals are not connected to ground in a second phase, wherein the M source driver chips are in a low power consumption wakeup mode in the case that the M signal input terminals are not connected to ground, and the second phase indicates a phase in which the M source driver chips are expected to enter the low power consumption wakeup mode.

3. The timing controller according to claim 1, wherein the pull-down circuit comprises a first pull-down resistor, and the controller is configured to: control the timing transmission circuit to interrupt signal output in the first phase, and reduce a resistance of the first pull-down resistor in the first phase, such that the M signal output terminals are connected to ground in the first phase.

4. The timing controller according to claim 1, wherein the pull-down circuit comprises a pull-down switch and a second pull-down resistor that are connected in series, the second pull-down resistor being a fixed-value resistor, and the controller is configured to: control the timing transmission circuit to interrupt signal output in the first phase, and close the pull-down switch in the first phase, such that the M signal output terminals are connected to ground in the first phase.

5. The timing controller according to claim 2, wherein the pull-down circuit comprises a first pull-down resistor, and the controller is configured to increase a resistance of the first pull-down resistor in the second phase, such that the M signal output terminals are not connected to ground in the second phase.

6. The timing controller according to claim 2, wherein the pull-down circuit comprises a pull-down switch and a second pull-down resistor that are connected in series, the second pull-down resistor being a fixed-value resistor, and the controller is configured to open the pull-down switch in the second phase, such that the M signal output terminals are not connected to ground in the second phase.

7. A source driver chip, comprising:

a signal input terminal, wherein the signal input terminal is connected to a signal output terminal of a timing controller, and the signal output terminal is connected to ground in a first phase under control of the timing controller, wherein the first phase indicates a phase in which the source driver chip is expected to enter a low power consumption mode;

wherein the source driver chip is configured to enter the low power consumption mode in response to detecting that the signal input terminal is connected to ground;

wherein the signal output terminal is not connected to ground in a second phase under control of the timing controller, wherein the second phase indicates a phase in which the source driver chip is expected to enter a low power consumption wakeup mode, wherein a total duration of the first phase and the second phase is fixed, and a duration of the second phase is less than a reference duration; and wherein the source driver chip is configured to enter the low power consumption wakeup mode in response to detecting that the signal input terminal is not connected to ground.

8. The source driver chip according to claim 7, further comprising: a level detector connected to the signal input terminal, wherein the level detector is configured to determine whether the signal input terminal is connected to ground by detecting a level of the signal input terminal.

9. A drive circuit, comprising the timing controller as defined in claim 1, and a source drive chip; wherein the source driver chip comprises a signal input terminal, wherein the signal input terminal is connected to a signal output terminal of the timing controller, and the signal output terminal is connected to ground in a first phase under control of the timing controller, wherein the first phase indicates a phase in which the source driver chip is expected to enter a low power consumption mode; and the source driver chip is configured to enter the low power consumption mode in response to detecting that the signal input terminal is connected to ground.

10. A drive control method, applicable to a timing controller, the method comprising:

controlling M signal output terminals of the timing controller to be connected to ground in a first phase, such that M source driver chips enter a low power consumption mode in the case that M source driver chips detect that signal input terminals are connected to ground, wherein the first phase indicates a phase in which the M source driver chips are expected to enter the low power consumption mode;

wherein the timing controller comprises a controller, a timing transmission circuit, and a pull-down circuit comprising a first pull-down resistor; and wherein controlling the M signal output terminals of the timing controller to be connected to ground in the first phase comprises:

by the controller controlling the timing transmission circuit to interrupt signal output in the first phase, and reducing a resistance of the first pull-down resistor in the first phase, such that the M signal output terminals are connected to ground in the first phase.

11. The method according to claim 10, wherein controlling the timing transmission circuit to interrupt the signal output in the first phase, and reducing the resistance of the first pull-down resistor in the first phase comprise:

by the controller interrupting the signal output by the timing transmission circuit by transmitting a first timing control signal to the timing transmission circuit in the first phase, and reducing the resistance of the first pull-down resistor by transmitting a first pull-down control signal to the pull-down circuit in the first phase.

12. The method according to claim 10, wherein the timing controller comprises a controller, a timing transmission circuit, and a pull-down circuit, wherein the pull-down circuit comprises a pull-down switch and a second pull-down resistor that are connected in series, the second pull-down resistor being a fixed-value resistor; and controlling the M signal output terminals of the timing controller to be connected to ground in the first phase comprises:

by the controller controlling the timing transmission circuit to interrupt signal output in the first phase, and closing the pull-down switch in the first phase, such that the M signal output terminals are connected to ground in the first phase.

13. The method according to claim 12, wherein controlling the timing transmission circuit to interrupt the signal output in the first phase, and closing the pull-down switch in the first phase comprise:

by the controller interrupting the signal output by the timing transmission circuit by transmitting a first timing control signal to the timing transmission circuit in the first phase, and closing the pull-down switch by transmitting a second pull-down control signal to the pull-down circuit in the first phase.

14. The method according to claim 10, further comprising:

controlling the M signal output terminals not to be connected to ground in a second phase, such that the M source driver chips enter a low power consumption wakeup mode in the case that the M source driver chips detect that the signal input terminals are not connected to ground, wherein the second phase indicates a phase in which the M source driver chips are expected to enter the low power consumption wakeup mode.

15. The method according to claim 14, wherein a total duration of the first phase and the second phase is fixed, and a duration of the second phase is less than a reference duration.

16. The method according to claim 15, wherein the first phase and the second phase are two sub-phases in a horizontal-blanking phase, and the reference duration includes 48 clock periods.

17. The method according to claim 15, wherein the first phase and the second phase are two sub-phases in a vertical-blanking phase, and the reference duration includes 4000 clock periods.

18. A non-transitory computer-readable storage medium, storing one or more computer programs, wherein the one or more computer programs, when loaded and run by a processor, cause the processor to perform the method as defined in claim 10.

19. The method according to claim 15, wherein the first phase and the second phase are two sub-phases in a horizontal-blanking phase, and the reference duration includes 48 clock periods; the timing controller is configured to store a first amount, the first amount is an amount of clock calibration data to be transmitted in the horizontal-blanking phase, wherein the first amount is acquired based on a duration of the horizontal-blanking phase, and the first amount is less than 48;

the method further comprises:

determining, upon entering the low power consumption mode in the horizontal-blanking phase, a total duration for transmitting the first amount of clock calibration data based on a duration for transmitting each clock calibration data; and determining a time point of entering the low power consumption wakeup mode in the horizontal-blanking phase based on the total duration, and entering the low power consumption wakeup mode at the time point, so that clock calibration is performed within 48 clock periods ensured by one of configuration of physical layer parameters of the M source driver chips and structure optimization of a clock data recovery circuit.

20. The method according to claim 15, wherein the first phase and the second phase are two sub-phases in a vertical-blanking phase, and the reference duration includes 4000 clock periods; the timing controller is configured to store a second amount, the second amount is an amount of clock calibration data to be transmitted in the vertical-blanking phase, the second amount is acquired based on a duration of the vertical-blanking phase, the second amount is less than 4000;

the method further comprises:

determining, upon entering the low power consumption mode in the vertical-blanking phase, a total duration for transmitting the second amount of clock calibration data based on a duration for transmitting each clock calibration data; and determining a time point of entering the low power consumption wakeup mode in the vertical-blanking phase based on the total duration, and entering the low power consumption wakeup mode at the time point.

* * * * *